(12) United States Patent
Shinmura et al.

(10) Patent No.: US 6,338,022 B1
(45) Date of Patent: Jan. 8, 2002

(54) VEHICLE TRAVEL SAFETY DEVICE

(75) Inventors: Tomoyuki Shinmura; Kenji Kodaka, both of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/591,485

(22) Filed: Jun. 12, 2000

(30) Foreign Application Priority Data

Jun. 16, 1999 (JP) .......................................... 11-169618

(51) Int. Cl.⁷ ................................................ G08G 1/16
(52) U.S. Cl. ........................................ 701/301; 701/41
(58) Field of Search ............................ 701/23, 301, 41,
701/43; 180/421, 443, 280; 342/70, 71;
348/119, 148

(56) References Cited

U.S. PATENT DOCUMENTS

| | | | | |
|---|---|---|---|---|
| 5,790,403 A | * | 8/1998 | Nakayama | 364/424.033 |
| 5,854,987 A | * | 12/1998 | Sekine et al. | 701/41 |
| 5,928,299 A | * | 7/1999 | Sekine et al. | 701/41 |
| 6,009,377 A | * | 12/1999 | Hiwatashi | 701/301 |
| 6,134,509 A | * | 10/2000 | Furusho et al. | 702/167 |
| 6,138,062 A | * | 10/2000 | Usami | 701/23 |
| 6,173,222 B1 | * | 1/2001 | Seo et al. | 701/41 |

FOREIGN PATENT DOCUMENTS

JP  7-14100  1/1995

\* cited by examiner

*Primary Examiner*—Michael J. Zanelli
*Assistant Examiner*—Eric M Gibson
(74) *Attorney, Agent, or Firm*—Arent Fox Kintner Plotkin & Kahn, PLLC

(57) ABSTRACT

The operational burden and uncomfortable feeling given to a driver by automatically restoring the disturbance in the vehicle attitude of a vehicle caused by a collision avoidance control, is reduced when avoiding a collision between the vehicle and an oncoming vehicle by automatic steering. When there is a possibility of a collision between the vehicle and an oncoming vehicle, the collision with the oncoming vehicle is avoided by supplying a lateral movement control current $I_1$ having a sinusoidal shape to the actuator of the electric power steering device, to move the vehicle laterally. The yaw angle of the vehicle is detected by integrating the yaw rate simultaneously with the start of the lateral movement, and in order to return the vehicle attitude of the vehicle to its original state by converging the yaw angle to 0 in the final stage of the lateral movement, a yaw angle correction control current $I_2$ is superimposed on the lateral movement control current $I_1$ and supplied to the actuator. Thus, after avoiding a collision with the oncoming vehicle, the disturbance in the vehicle attitude can automatically be restored and the operational burden and uncomfortable feeling given to the driver can be reduced.

11 Claims, 23 Drawing Sheets

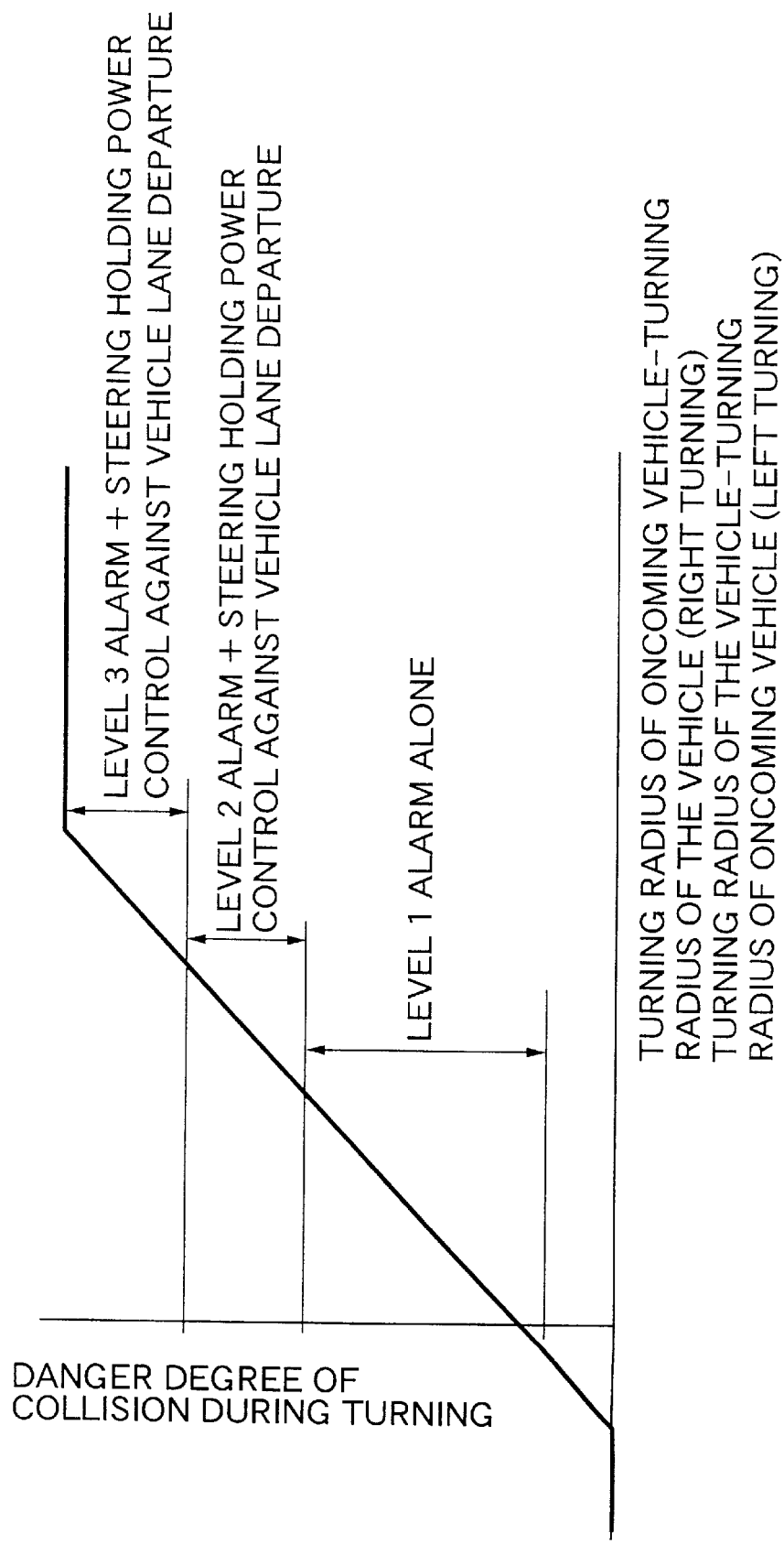

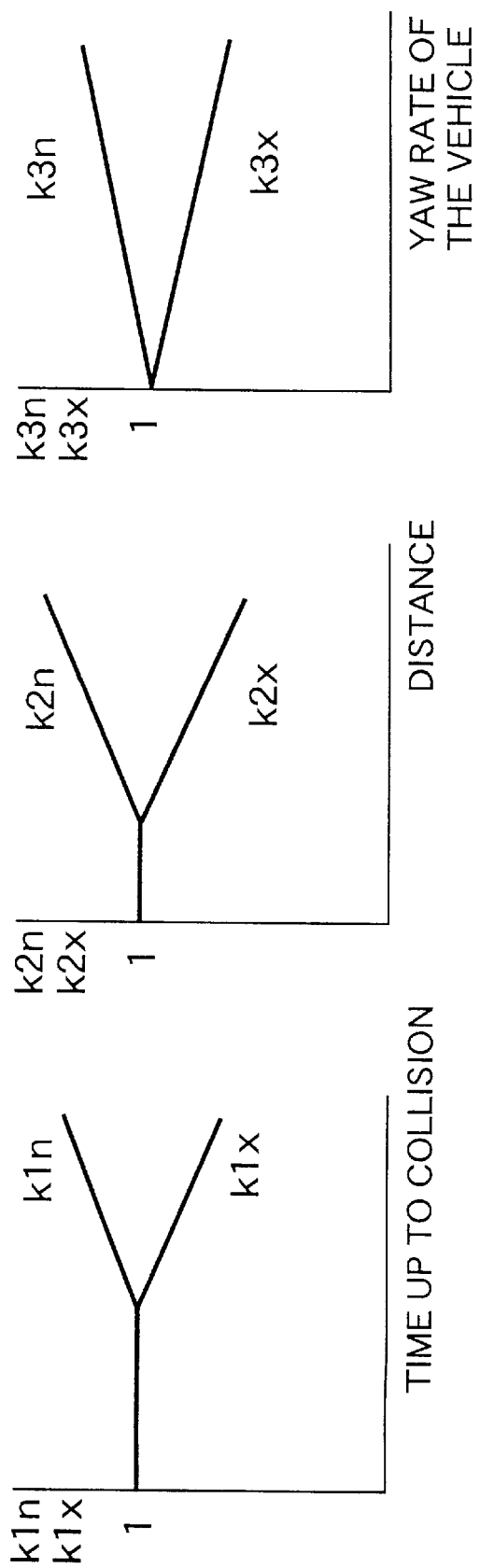

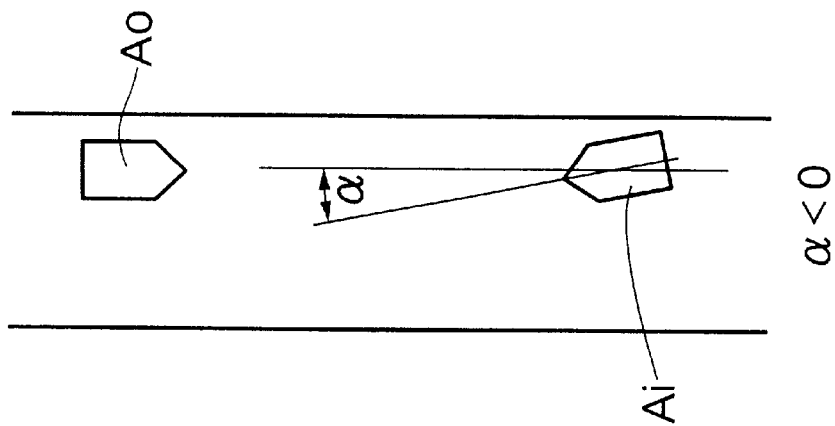
FIG.20C  α < 0
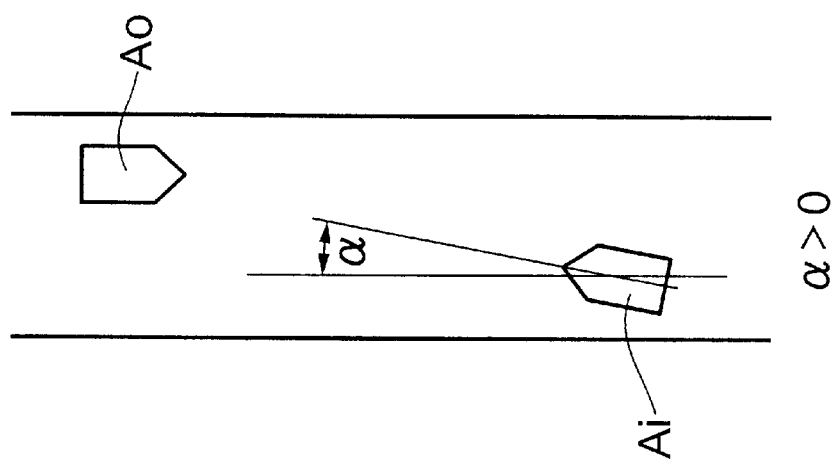
FIG.20B  α > 0
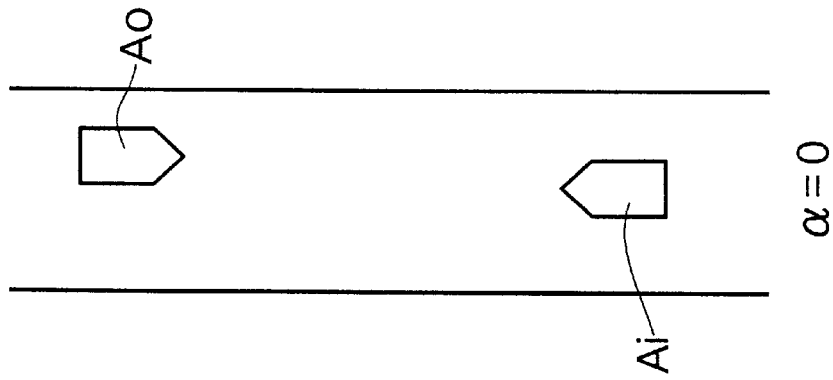
FIG.20A  α = 0

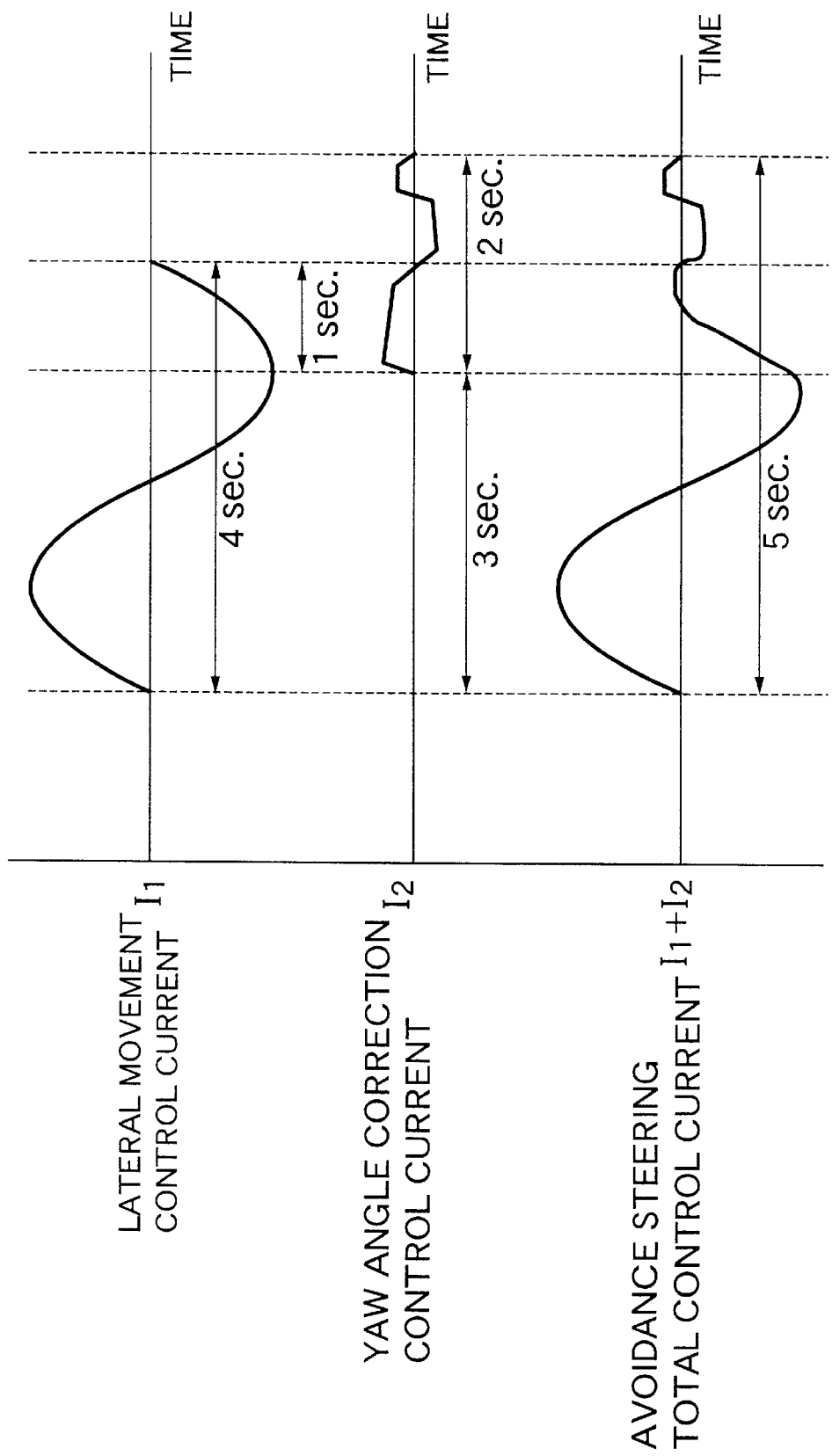

VEHICLE TRAVEL SAFETY DEVICE

BACKGROUND OF THE INVENTION

1. Field of the Invention

The present invention relates to vehicle travel safety devices for preventing a vehicle from colliding with an oncoming vehicle by using an object detecting means such as a radar device.

2. Description of the Prior Art

Such a vehicle travel safety device is already known from Japanese Patent Application Laid-open No. 7-14100.

In the above-mentioned publication, the possibility of a collision of a vehicle with an oncoming vehicle is determined on the basis of the distance between the vehicle and the oncoming vehicle, the relative speed between the vehicle and the oncoming vehicle, the vehicle speed of the vehicle and the image in front of the vehicle, and in the case where there is a possibility of a collision, the collision is avoided by alerting the driver with an alarm or by carrying out automatic braking.

In the case where there is a possibility of a collision between a vehicle and an oncoming vehicle, consideration can be given to avoiding the collision by carrying out automatic steering instead of automatic braking or in addition to automatic braking. In such a case, since the vehicle attitude of the vehicle is disturbed due to automatic steering being used, the driver is forced to perform an operation to return the vehicle attitude to its original state, and thus there is the problem that the driver receives an operational burden and an uncomfortable feeling.

SUMMARY OF THE INVENTION

The present invention has been made in view of the above circumstances, and it is an object of the present invention to reduce the operational burden and the uncomfortable feeling given to the driver by automatically restoring the disturbance in the vehicle attitude of the vehicle caused by the collision avoidance control when avoiding a collision between the vehicle and an oncoming vehicle by means of automatic steering.

In order to achieve the above object, there is proposed a vehicle travel safety device comprising an object detecting means for detecting an object present in the direction in which a vehicle is traveling, a vehicle speed detecting means for detecting the vehicle speed, a relationship calculating means for detecting an oncoming vehicle on the basis of the result of detecting by the object detecting means and the vehicle speed of the vehicle detected by the vehicle speed detecting means and for calculating the relationship between the vehicle and the oncoming vehicle. A collision determining means determines the possibility of a collision between the vehicle and the oncoming vehicle on the basis of the relationship calculated by the relationship calculating means, an actuator steers the vehicle, and an actuator control means controls the driving of the actuator when it is determined by the collision determining means that there is a possibility of a collision. The driving of the actuator includes a lateral movement control for moving the vehicle laterally in order to avoid the collision between the vehicle and the oncoming vehicle and a yaw angle correction control to return the vehicle attitude of the vehicle after the avoidance of the collision, to the state the vehicle attitude was in prior to the avoidance of the collision.

In accordance with this arrangement, when it is determined that there is a possibility of a collision between the vehicle and the oncoming vehicle, since the actuator control means controls the driving of the actuator to move the vehicle laterally, a collision with the oncoming vehicle can be avoided reliably even in the case where the driver does not spontaneously carry out an operation to avoid the collision. Moreover, even when the vehicle attitude of the vehicle is disturbed due to the lateral movement control by the actuator, since the vehicle attitude of the vehicle is returned to the state it was in prior to the avoidance of the collision by controlling the actuator using a yaw angle correction, the vehicle attitude can be automatically restored to its original state and the operational burden and the uncomfortable feeling given to the driver can be reduced.

In accordance with the invention, there is proposed a vehicle travel safety device wherein the collision determining means determines the possibility of a collision on the basis of a comparison between a correct route by which the vehicle can correctly pass the oncoming vehicle and a predicted collision position at which the vehicle is presumed to collide with the oncoming vehicle.

In accordance with this arrangement, since the possibility of a collision is determined on the basis of a comparison between the correct route via which the vehicle can correctly pass the oncoming vehicle and the predicted collision position at which the vehicle is presumed to collide with the oncoming vehicle, it is possible to accurately determine the possibility of a collision between the vehicle and the oncoming vehicle.

Further, in accordance with the invention, there is proposed a vehicle travel safety device comprising a vehicle yaw rate detecting means for detecting the yaw rate of the vehicle, and the vehicle attitude is detected by integrating the yaw rate detected by the vehicle yaw rate detecting means from the point at which the lateral movement control is started.

In accordance with this arrangement, by integrating the yaw rate of the vehicle from the point at which the lateral movement control is started, the yaw angle of the vehicle, that is to say the vehicle attitude of the vehicle, can be detected accurately. Moreover, by setting the initial value for the yaw angle to zero (0) at the point at which the lateral movement control is started, the influence of drift in the yaw rate detecting means can be eliminated to enhance the precision with which the yaw angle of the vehicle is detected.

In accordance with the invention, there is proposed a vehicle travel safety device wherein the yaw angle correction control is carried out in order to converge the integral value of the yaw rate to zero (0).

In accordance with this arrangement, by carrying out the yaw angle correction control to converge the integral value of the yaw rate to zero (0), after the avoidance of a collision, the vehicle attitude can be returned exactly to the state it was in prior to the avoidance of the collision.

In accordance with the invention, there is proposed a vehicle travel safety device wherein the yaw angle correction control is started at a predetermined time before the completion of the lateral movement control or at a predetermined time after the start of the lateral movement control.

In accordance with this arrangement, since the yaw angle correction control is started at a predetermined time before the completion of the lateral movement control or at a predetermined time after the start of the lateral movement control, a collision can be avoided effectively by effective liaison between the lateral movement control and the yaw angle correction control and the vehicle attitude can quickly be returned to the state it was in prior to the avoidance of the collision, without giving the driver an uncomfortable feeling.

In accordance with the invention, there is proposed a vehicle travel safety device wherein the lateral movement control is completed in a predetermined time after it has started.

In accordance with this feature, the lateral movement control is carried out over a predetermined period, and the lateral movement control can be prevented from being carried out rapidly thus changing the vehicle attitude suddenly.

In accordance with the invention, there is proposed a vehicle travel safety device wherein the yaw angle correction control is completed in a predetermined time after it has started.

In accordance with this arrangement, since the yaw angle correction control is completed in a predetermined time, endless continuation of the yaw angle correction control causing the driver to receive an uncomfortable feeling, can be prevented.

In accordance with the invention, there is proposed a vehicle travel safety device wherein the driving force of the actuator in the yaw angle correction control is set to be smaller than the driving force of the actuator in the lateral movement control.

In accordance with this arrangement, since the driving force of the actuator in the yaw angle correction control is set to be smaller than the driving force of the actuator in the lateral movement control, inhibition of the smooth lateral movement of the vehicle can be prevented, and thus any uncomfortable feeling given to the driver can be reduced.

In accordance with the invention, there is proposed a vehicle travel safety device wherein the amount of drive of the actuator in the lateral movement control is set so that the amount of lateral movement of the vehicle based on the amount of drive is not higher than a predetermined level.

In accordance with this arrangement, since the amount of drive of the actuator to automatically avoid an oncoming vehicle is restricted not to be higher than a predetermined level, the vehicle can be prevented from drifting off the road due to too large an amount of lateral movement of the vehicle.

In accordance with the invention, there is proposed a vehicle travel safety device wherein the amount of drive of the actuator in the lateral movement control increases as the direction in which the vehicle is traveling approaches the oncoming vehicle.

In accordance with this arrangement, since the amount of drive of the actuator in the lateral movement control increases as the direction in which the vehicle is traveling approaches the oncoming vehicle, a collision can be avoided reliably by generating a large amount of lateral movement when there is a high possibility of a collision.

In accordance with the invention, there is proposed a vehicle travel safety device wherein the lower the vehicle speed of the vehicle, the larger the amount of drive of the actuator in the lateral movement control.

In accordance with this arrangement, since the lower the vehicle speed of the vehicle the larger the amount of drive of the actuator that is needed in the lateral movement control, when there is a high possibility of a collision the collision can be avoided reliably by carrying out the lateral movement with good responsiveness.

BRIEF DESCRIPTION OF THE DRAWINGS

The practical features of the present invention are described below by reference to the embodiment of the present invention shown in the attached drawings.

FIG. 1 to FIG. 24 illustrate an embodiment of the present invention.

FIG. 1 is an overall view of the arrangement of a vehicle in which a travel safety device according to the embodiment of the present invention is mounted.

FIG. 2 is a block diagram of the travel safety device.

FIG. 3 is a perspective view of the steering device of a vehicle.

FIG. 4 is a diagram explaining the function of an electronic control unit.

FIG. 5 is a block diagram illustrating the circuit components of a head-on collision avoidance control means.

FIG. 6 is a flowchart for a main routine according to the embodiment of the present invention.

FIG. 7 is a flowchart for a head-on collision avoidance control routine.

FIG. 8 is a flowchart for a turning collision avoidance control routine.

FIG. 9 is a flowchart for a head-on collision determination routine.

FIG. 10 is a flowchart for an alarm control routine.

FIG. 11 is a flowchart for a lateral movement control routine.

FIG. 12 is a flowchart for a yaw angle correction control routine.

FIG. 14 is a graph illustrating the details of a turning collision avoidance control.

FIG. 15 is a diagram explaining a technique of calculating the lateral deviation δd (in the case where a collision occurs).

FIG. 16 is a diagram explaining a technique of calculating the lateral deviation δd (in the case where the vehicle passes on the left side of the oncoming vehicle).

FIG. 17 is a diagram explaining a technique of calculating the lateral deviation δd (in the case where the vehicle passes on the right side of the oncoming vehicle).

FIGS. 18A–18C are maps for looking up the correction coefficient of the lateral deviation δd.

FIGS. 20A–20C are diagrams explaining the deflection angle of the vehicle.

FIG. 21 is a map for looking up the correction coefficient for the lateral movement control current from the deflection angle.

FIG. 22 is a map for looking up the correction coefficient for the lateral movement control current from the vehicle speed.

FIG. 23 is a block diagram of an actuator control system.

FIG. 24 is a graph explaining the addition of the lateral movement control current to the yaw angle correction control current.

DETAILED DESCRIPTION OF THE PREFERRED EMBODIMENT

Figure 1:
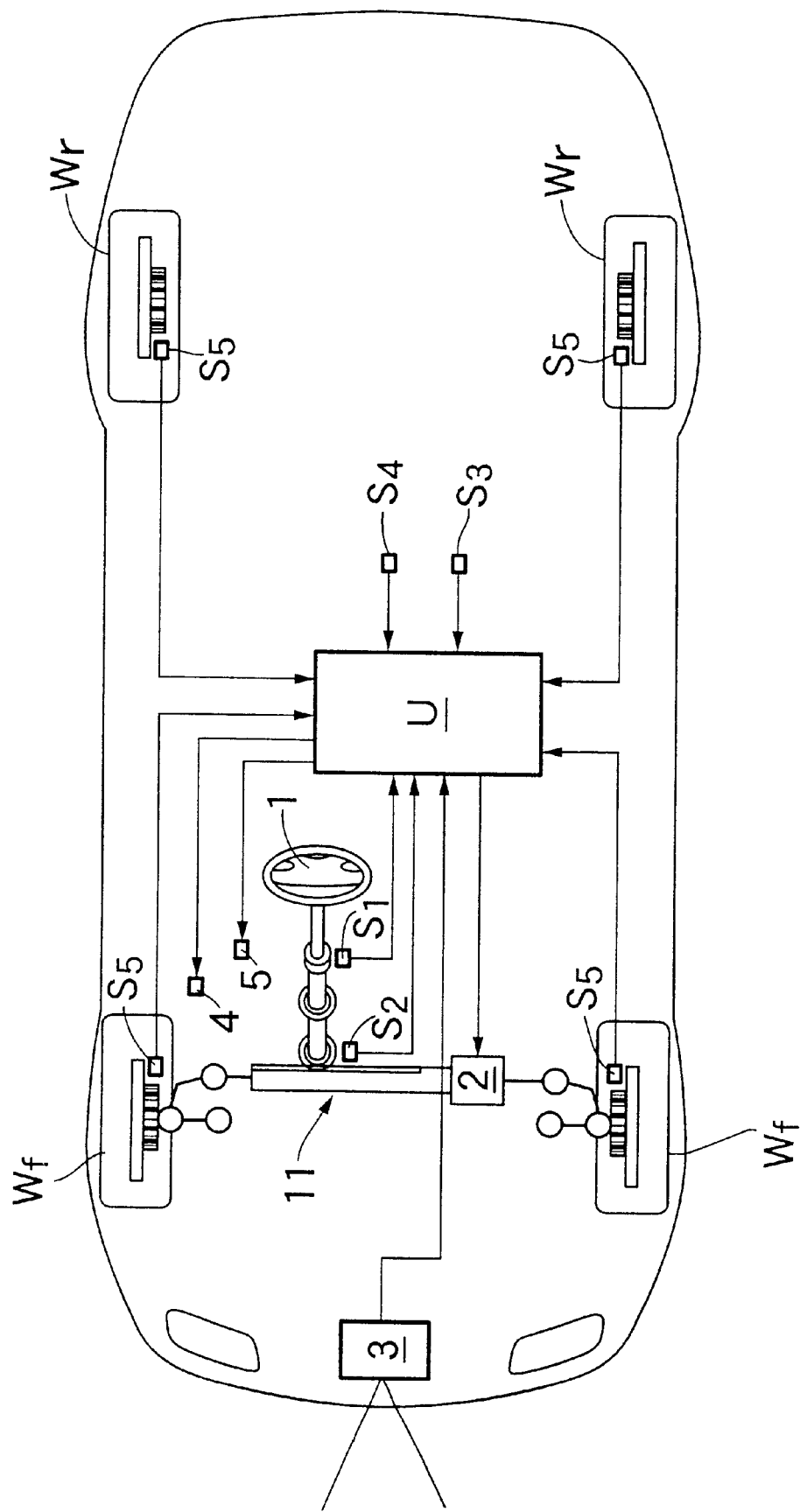
Figure 2:
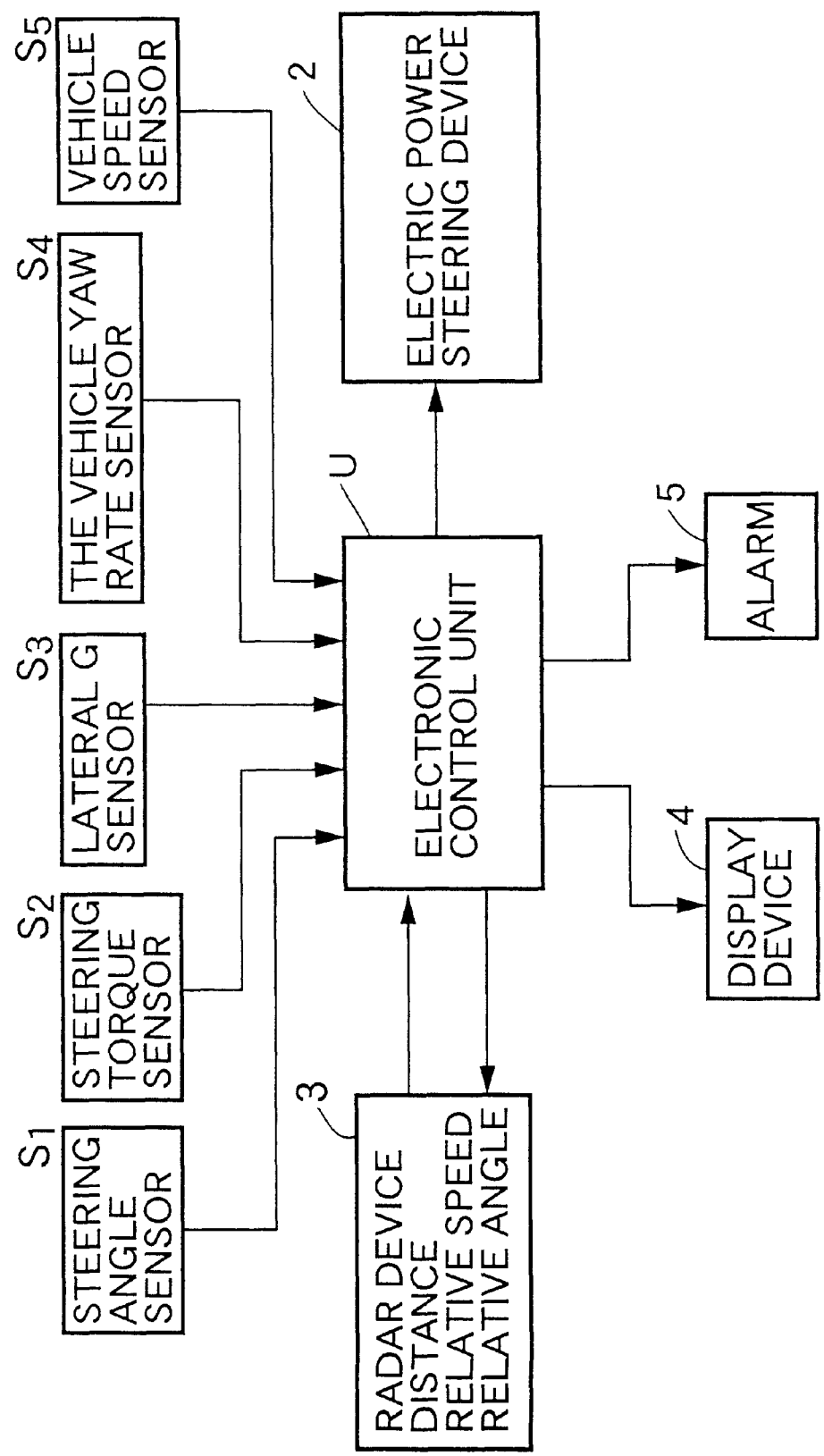

As shown in FIG. 1 and FIG. 2, a vehicle having right and left front wheels Wf, Wf and right and left rear wheels Wr, Wr comprises a steering wheel 1 for steering the right and left front wheels Wf, Wf which are the steered wheels and an electric power steering device 2 for generating a steering force for assisting the operation of the steering wheel 1 by a driver and a steering force for avoiding a collision. An electronic control unit U for controlling the operation of the electric power steering device 2, receives input signals from a radar device 3 which is an object detecting means, a steering angle sensor $S_1$ for detecting the steering angle of the steering wheel 1, a steering torque sensor $S_2$ for detecting the steering torque which is input into the steering wheel 1, a lateral acceleration sensor $S_3$ for detecting the lateral acceleration of the vehicle body, a vehicle yaw rate sensor $S_4$ for detecting the yaw rate of the vehicle body, and vehicle speed sensors $S_5$ . . . for detecting the number of rotation of the wheels Wf, Wf; Wr, Wr. The electronic control unit U controls the operation of the electric power steering device 2 on the basis of signals from the radar device 3 and the sensors $S_1$ to $S_5$ . . . and also controls the operation of a display device 4 comprising a liquid crystal display and an alarm 5 comprising a buzzer or a lamp.

The radar device 3 sends electromagnetic waves in a predetermined range in the lateral direction in the forward direction of the vehicle and receives the reflected waves formed by the electromagnetic waves being reflected from an object, and thus the distance between the vehicle and the object, the relative speed between the vehicle and the object and the direction of the object are detected. In the present embodiment, a milli-wave radar is used which can detect the relationship between the vehicle and the object using a single send-receive event.

Figure 3:
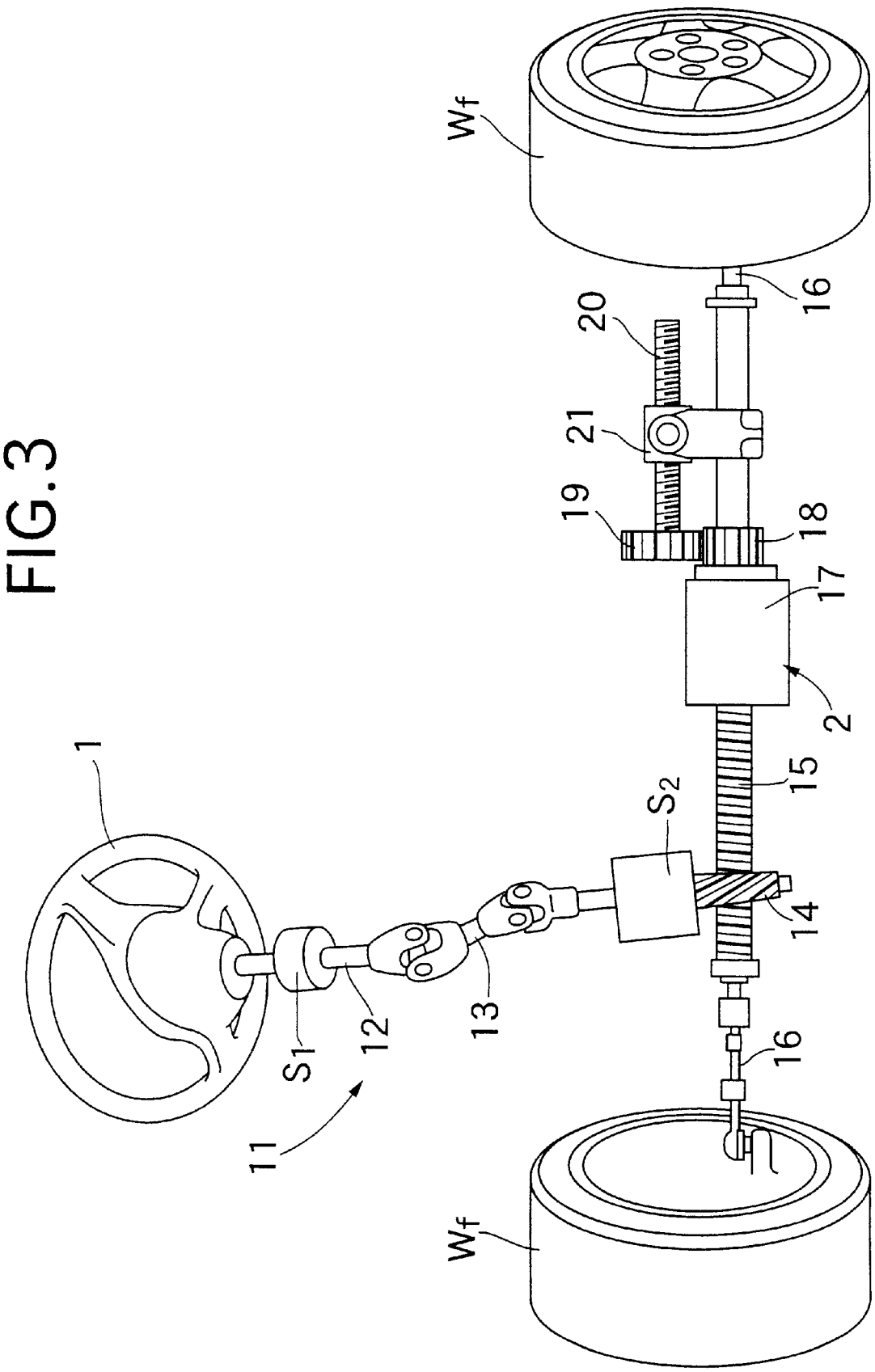

FIG. 3 shows the structure of a steering device 11 in which rotation of the steering wheel 1 is transmitted to a rack 15 via a steering shaft 12, a link shaft 13 and a pinion 14 and, moreover, the reciprocating motion of the rack 15 is transmitted to the right and left front wheels Wf, Wf via right and left tie rods 16, 16. The electric power steering device 2 provided on the steering device 11 comprises a drive gear 18 provided on the output shaft of the actuator 17 formed from an electric motor, a driven gear 19 meshing with the drive gear 18, a screw shaft 20 which is integrated with the driven gear 19, and a nut 21 which meshes with the screw shaft 20 and is linked to the rack 15. When the actuator 17 is driven, the driving force can be transmitted to the right and left front wheels Wf, Wf via the drive gear 18, the driven gear 19, the screw shaft 20, the nut 21, the rack 15 and the right and left tie rods 16, 16.

Figure 4:
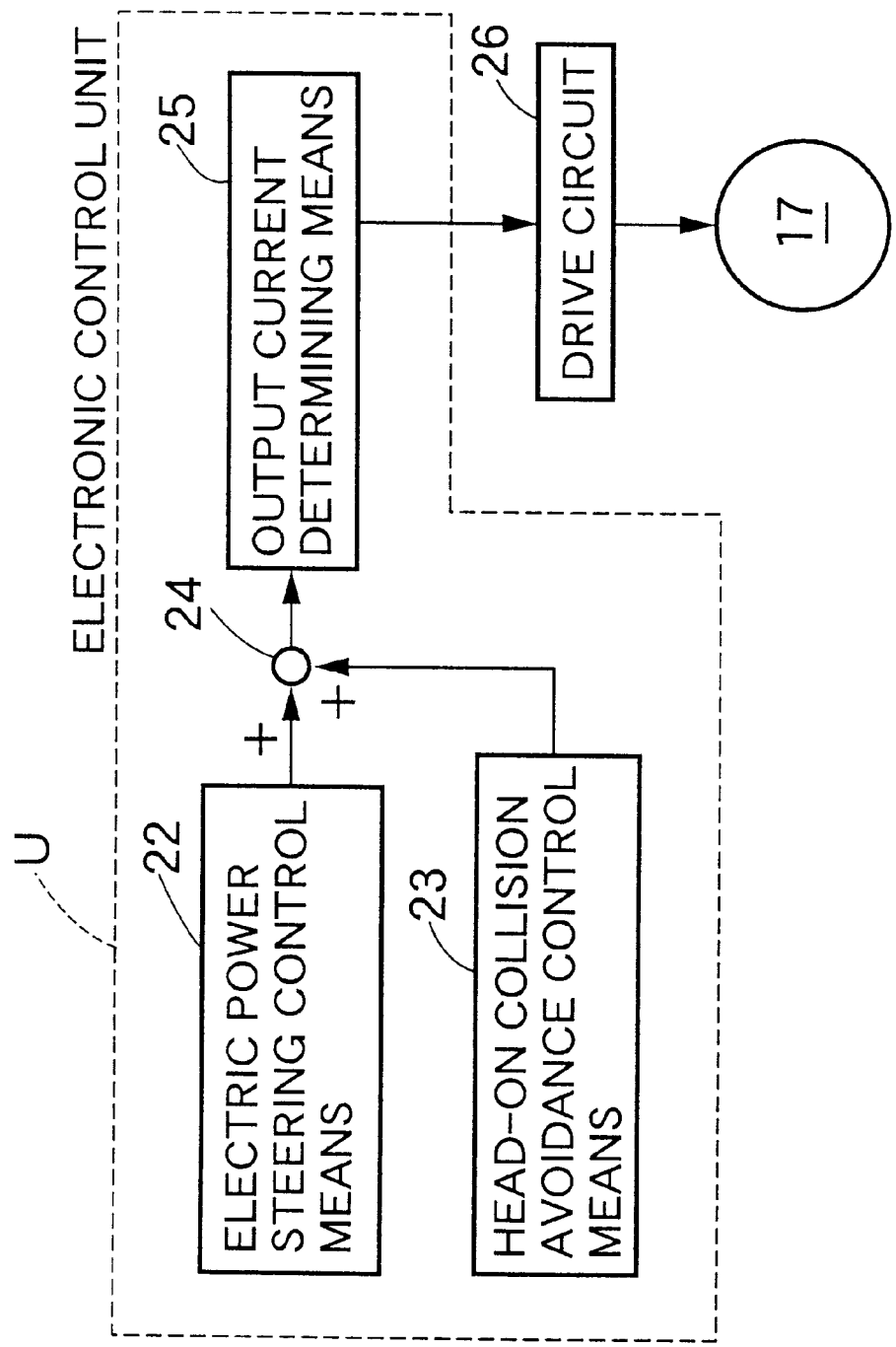

As shown in FIG. 4, the electronic control unit U comprises an electric power steering control means 22, a head-on collision avoidance control means 23, an addition means 24 and an output current determining means 25. The electric power steering control means 22 outputs a control signal so that the steering torque calculated on the basis of the output from the steering torque sensor $S_2$, reaches a predetermined value which corresponds with the vehicle speed calculated on the basis of outputs from the vehicle speed sensors $S_5$ . . . . The output current determining means 25 determines the output current to the actuator 17 on the basis of the control signal. The operation of the steering wheel 1 by the driver, is assisted by outputting the output current to the actuator 17 via a drive circuit 26. On the other hand, in the case where there is a possibility of a head-on collision between the vehicle and an oncoming vehicle, the head-on collision avoidance control means 23 outputs a control signal for avoiding the collision and by controlling the driving of the actuator 17 via the output current determining means 25 and the driving circuit 26 using the control signal, automatic steering is carried out in order to avoid the head-on collision with the oncoming vehicle. The details of this automatic steering will be described below.

Since the addition means 24 adds the control signal which is output from the electric power steering control means 22 and the control signal which is output from the head-on collision avoidance means 23, even while automatic steering is being executed in order to avoid a head-on collision, it is possible for an unchanged assist function of the electric power steering device 2 to be exhibited in response to a spontaneous steering operation by the driver, and thus elimination of the assist function of the electric power steering device 2 during execution of the automatic steering, which gives an uncomfortable feeling to the driver, can be prevented.

Figure 13A:
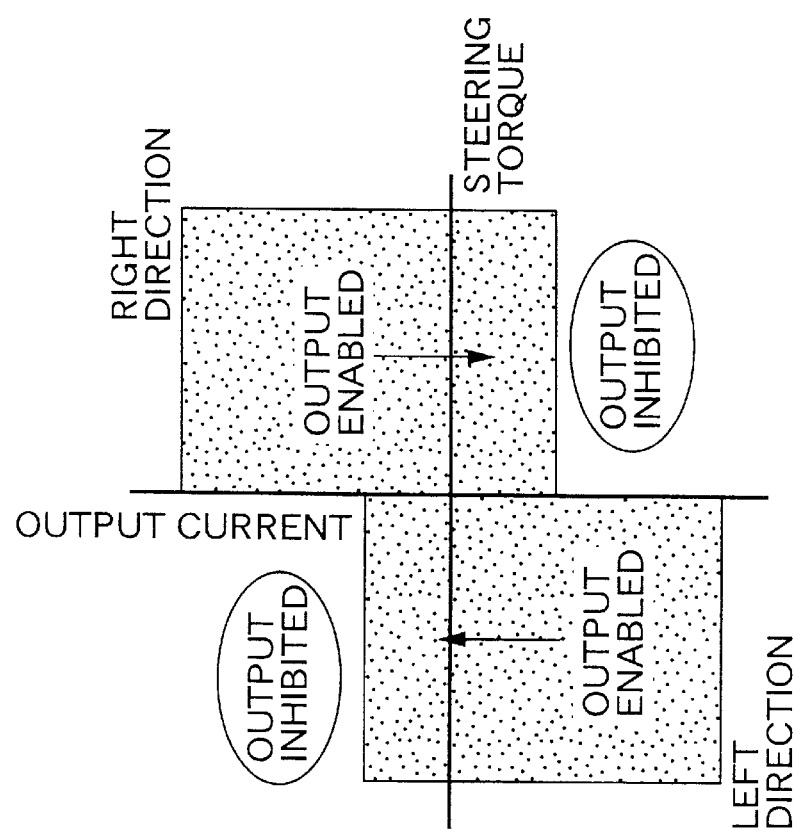
FIGS. 13A and 13B are maps illustrating regions in which the driving current for the actuator can be output.

As shown in FIG. 13A, control of the electric power steering device 2 is generally set so that the direction of the current for driving the actuator 17 corresponds to the direction of the steering torque which is input into the steering wheel 1 by the driver. That is, the actuator 17 is designed to generate a steering torque only in the direction in which the operation of the steering wheel 1 by the driver is assisted.

Figure 13B:
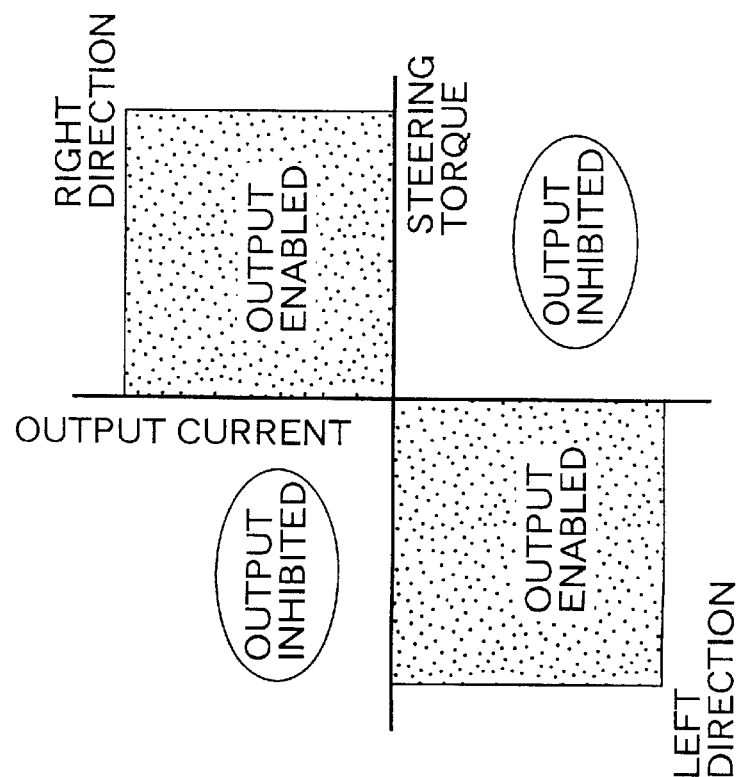

However, when the control signal from the electric power steering control means 22 and the control signal from the head-on collision avoidance control means 23 are added, there is a case in which the direction of the steering torque (the control signal for the electric power steering control means 22) being input into the steering wheel 1 by the driver does not agree with the direction of the current for driving the actuator 17 and, in such a case, if the current for driving the actuator 17 is determined on the basis of the map shown in FIG. 13A, there is a possibility that automatic steering for avoiding the head-on collision might be inhibited or weakened and an effect sufficient to prevent the collision might not be exhibited. Therefore, in the present embodiment by employing the map shown in FIG. 13B instead of the map shown in FIG. 13A, the case in which the direction of the steering torque being input into the steering wheel 1 by the driver does not coincide with the direction of the current for driving the actuator 17 is partially allowed thus ensuring that the function of the automatic steering for avoiding a head-on collision can be exhibited without problems.

Figure 5:
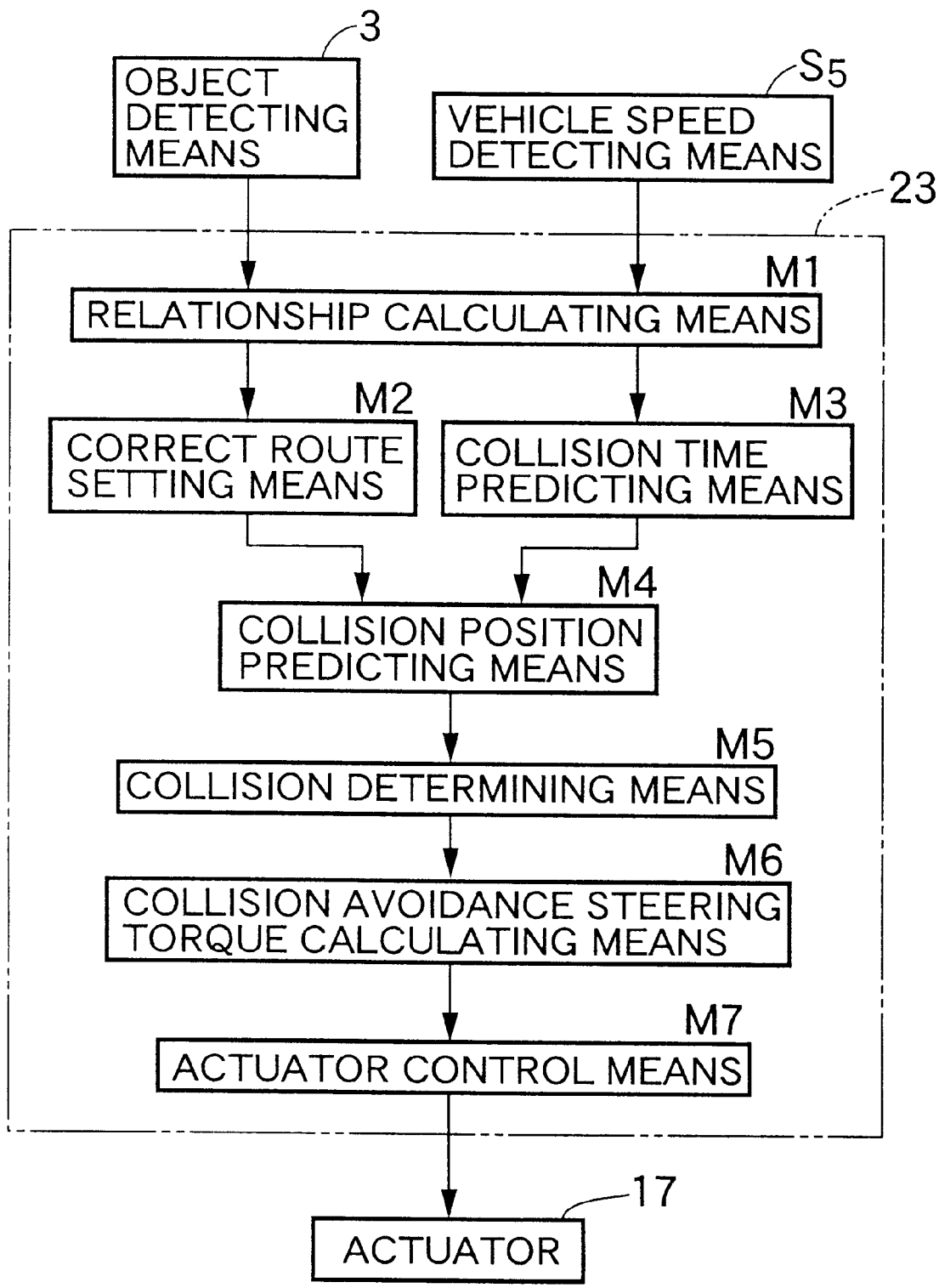

Next, the arrangement of the head-on collision avoidance control means 23 and an outline of its function are explained by reference to FIG. 5.

The head-on collision avoidance control means 23 comprises a relationship calculating means M1, a correct route setting means M2, a collision time predicting means M3, a collision position predicting means M4, a collision determining means M5, a collision avoidance steering torque calculating means M6 and an actuator control means M7.

The relationship calculating means M1 calculates the relative angle (relative position) 2, the distance L and the relative speed Vs between the vehicle Ai and the oncoming vehicle Ao on the basis of outputs from the object detecting means (the radar device 3) and the vehicle speed detecting means (the vehicle speed sensors $S_5$ . . . ). The correct route setting means M2 sets the original correct route R for the vehicle Ai for it to pass the oncoming vehicle Ao correctly. The collision time predicting means M3 predicts a collision time at which the vehicle Ai will pass by the oncoming vehicle Ao. The collision position predicting means M4 determines a predicted collision position P where the vehicle Ai is expected to collide with the oncoming vehicle Ao at the collision time. The collision determining means M5 determines the possibility of a collision between the vehicle Ai and the oncoming vehicle Ao by comparing the predicted collision position P with the correct route R. The collision avoidance steering torque calculating means M6 calculates the steering torque (that is, the current which is supplied to the actuator 17) that is to be generated by the actuator 17 in order to avoid a collision between the vehicle Ai and the oncoming vehicle Ao. Finally, the actuator control means M7 controls the operation of the actuator 17 to avoid a collision between the vehicle Ai and the oncoming vehicle Ao by generating the steering torque calculated by the collision avoidance steering torque calculating means M6 in the actuator 17.

The operation of the present embodiment is explained in detail by reference to the flowcharts in FIG. 6 to FIG. 12.

Figure 6:
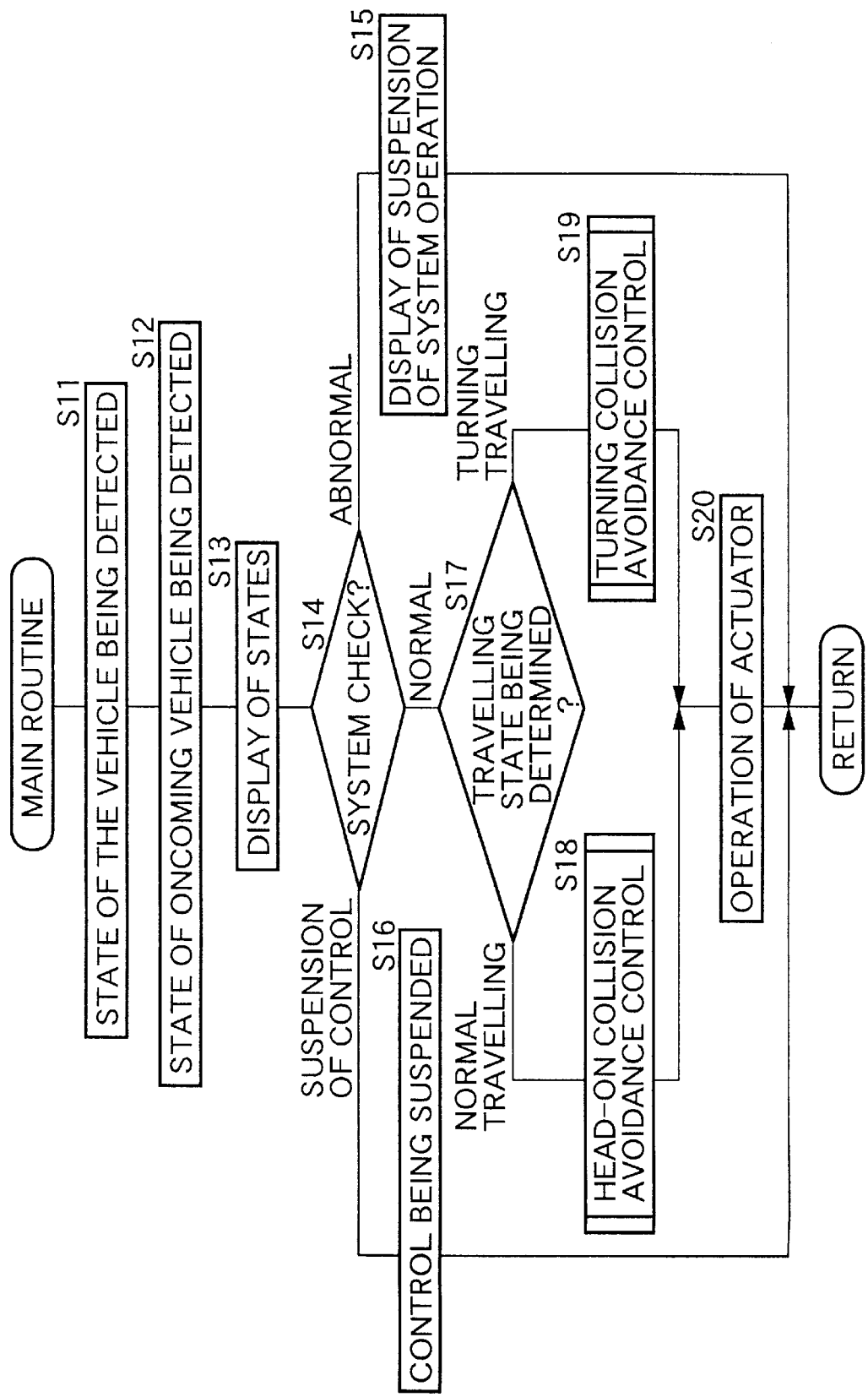

Firstly, in step S11 of the main routine in FIG. 6, the state of the vehicle is detected on the basis of outputs from the steering angle sensor $S_1$, the steering torque sensor $S_2$, the lateral acceleration sensor $S_3$, the vehicle yaw rate sensor $S_4$ and vehicle speed sensors $S_5$ . . . . In the subsequent step S12 the state of the oncoming vehicle is detected by the radar device 3. Although the radar device 3 detects vehicles traveling in front, pedestrian bridges, signs, cat's-eyes, etc. as well as oncoming vehicles, it can discriminate oncoming vehicles from other objects on the basis of the speed relative to the vehicle. In the subsequent step S13 the state of the vehicle and the state of the oncoming vehicle are displayed on the display device 4.

The subsequent step S14 checks whether or not the head-on collision avoidance control is being carried out correctly on the basis of the results detected by the radar device 3 and the sensors $S_1$ to $S_5$ . . . . The head-on collision avoidance control is carried out only in the case where the driver is not traveling under extreme conditions and, for example, when traveling excessively fast, operation of the system is suspended in step S15 and the driver is informed of this matter by means of the display device 4 so inviting attention to correct driving. In the case where the driver carries out a spontaneous operation in order to avoid a head-on collision with the oncoming vehicle as a result of the system check in step S14, that is, in the case where a large steering torque is input into the steering wheel 1 or braking operation is carried out by depressing the brake pedal, the head-on collision avoidance control is suspended in step S16, normal electric power steering control is resumed and the driver is informed of this matter by means of the display device 4. Thus, it is possible to avoid interference between a spontaneous steering operation by the driver and the automatic steering control of the head-on collision avoidance control.

If the results of the system check in the step S14 are normal, the traveling state of the vehicle is determined in step S17. When the vehicle is in a traveling state where it is going nearly straight ahead and it is possible to accurately predict the time when it will pass or collide with, the oncoming vehicle and the positional relationship at that time between the vehicle and the oncoming vehicle on the basis of the results detected by the radar device 3 and the sensors $S_1$ to $S_5$ . . . , it moves on to step S18 to carry out the head-on collision avoidance control. On the other hand, in the case where the degree of turning of the vehicle is high, even though the vehicle is not traveling with excessive speed, and it is therefore impossible to accurately predict the time when it will pass or collide with, an oncoming vehicle and the positional relationship at that time between the vehicle and the oncoming vehicle, it moves to step S19 to carry out the collision avoidance control during control. Furthermore, in step S20, in order to avoid a collision between the vehicle and the oncoming vehicle, the actuator 17 of the electric power steering device 2 is operated in accordance with the head-on collision avoidance control or the collision avoidance control during turning.

Next, the details of the 'head-on collision avoidance control' in step S18 are explained by reference to the flowchart in FIG. 7.

Firstly, in step S21 a collision determining parameter for denoting the degree of possibility of the vehicle colliding with the oncoming vehicle, that is to say, the lateral deviation δd between the vehicle and the oncoming vehicle at the time when the vehicle passes or collides with the oncoming vehicle is calculated. Subsequently, in step S22 the possibility of a collision is determined by comparing the lateral deviation δd with the threshold value described below, and when there is a small possibility of a collision, the alarm 5 is operated in step S23 to alert the driver. When there is a high possibility of a collision, an alarm is raised and at the same time the actuator 17 is operated in step S24 to carry out automatic steering in order to avoid the oncoming vehicle. The details of the 'collision determination' in step S22, the 'alarm control' in step S23 and the 'avoidance steering control' in step S24 are described below by reference to the flowcharts in FIG. 9 to FIG. 12.

Figure 8:
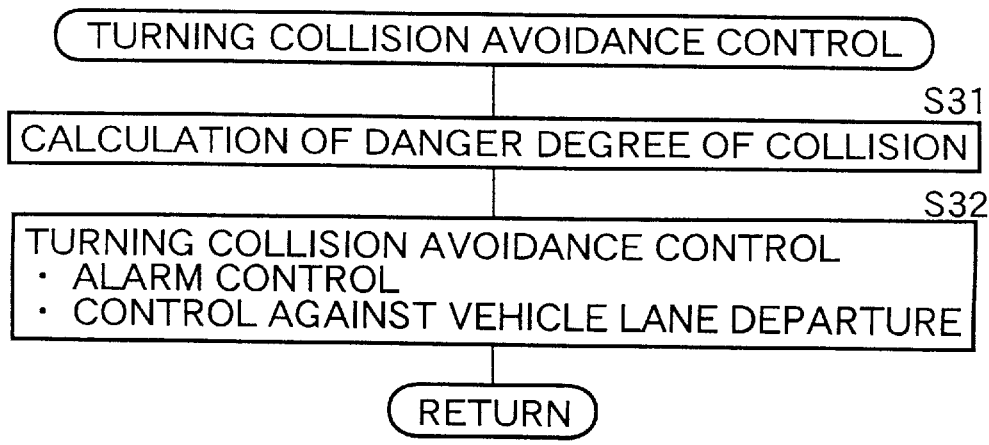

Next, the details of the 'turning collision avoidance control' in step S19 are explained by reference to the flowchart in FIG. 8.

Firstly, in step S31 the degree of danger of a collision during turning is calculated. The degree of danger of a collision is determined on the basis of the absolute value of the difference between the turning radius of the vehicle and the turning radius of the oncoming vehicle, and it is determined that the degree of danger is high if the absolute value of the difference is large. In step S32 the alarm control and the vehicle lane departure prevention control are carried out according to the degree of danger. Since it is difficult to accurately predict the time when the oncoming vehicle will be passed and the positional relationship at that time between the vehicle and the oncoming vehicle during turning, the collision avoidance control is weaker in comparison to when the vehicle is traveling straight ahead.

As shown in FIG. 14, the degree of danger of collision during turning is set by categorizing it into the three stages of level 1, level 2 and level 3, and these levels are determined, for example, on the basis of the turning radius of the oncoming vehicle—the turning radius of the vehicle, when the vehicle is turning right on a road where driving is on the left, and on the basis of the turning radius of the vehicle—the turning radius of the oncoming vehicle when the vehicle is turning left. At level 1 where the degree of danger is low, a warning is only given by the alarm 4, and at level 2 where the degree of danger is medium and at level 3 where the degree of danger is high, a warning is given using the alarm 4 and the vehicle lane departure prevention control is carried out by the actuator 17. It is also possible to set the vehicle lane departure prevention control to be rather weak for level 2 where the degree of danger is medium and to be rather strong for level 3 where the degree of danger is high. The vehicle lane departure prevention control prevents the vehicle from departing from the lane when the driver has steered in the direction which would lead to departing from the vehicle lane by driving the actuator 17 of the electric power steering device 2 to generate an opposing steering force which counteracts the steering.

In order to differentiate the alarm in the 'turning collision avoidance control' from the alarm in the 'head-on collision avoidance control', the sound of the buzzer or the color of the lamp of the alarm 5 is varied.

Figure 9:
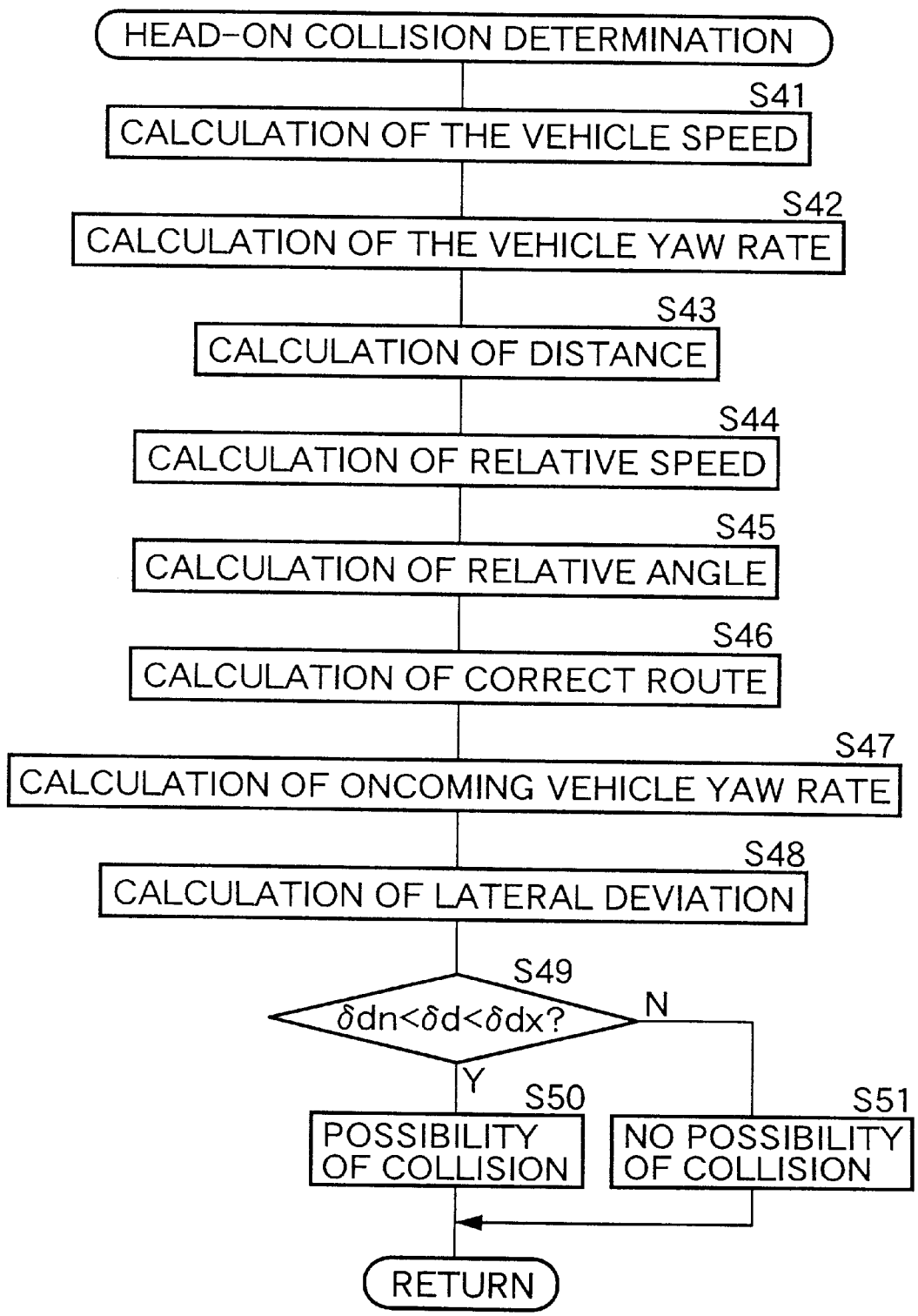
Figure 15:
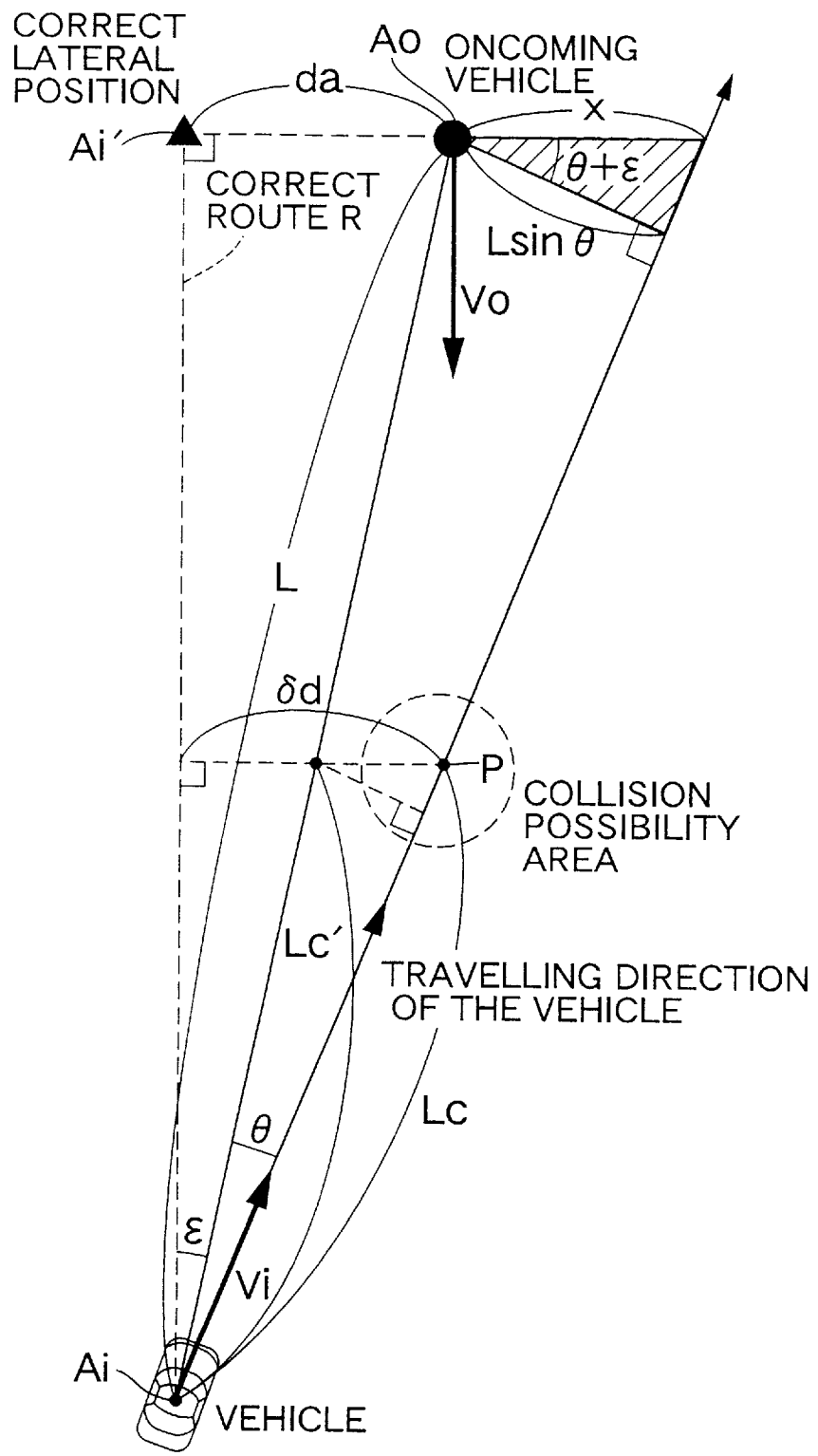
Figure 16:
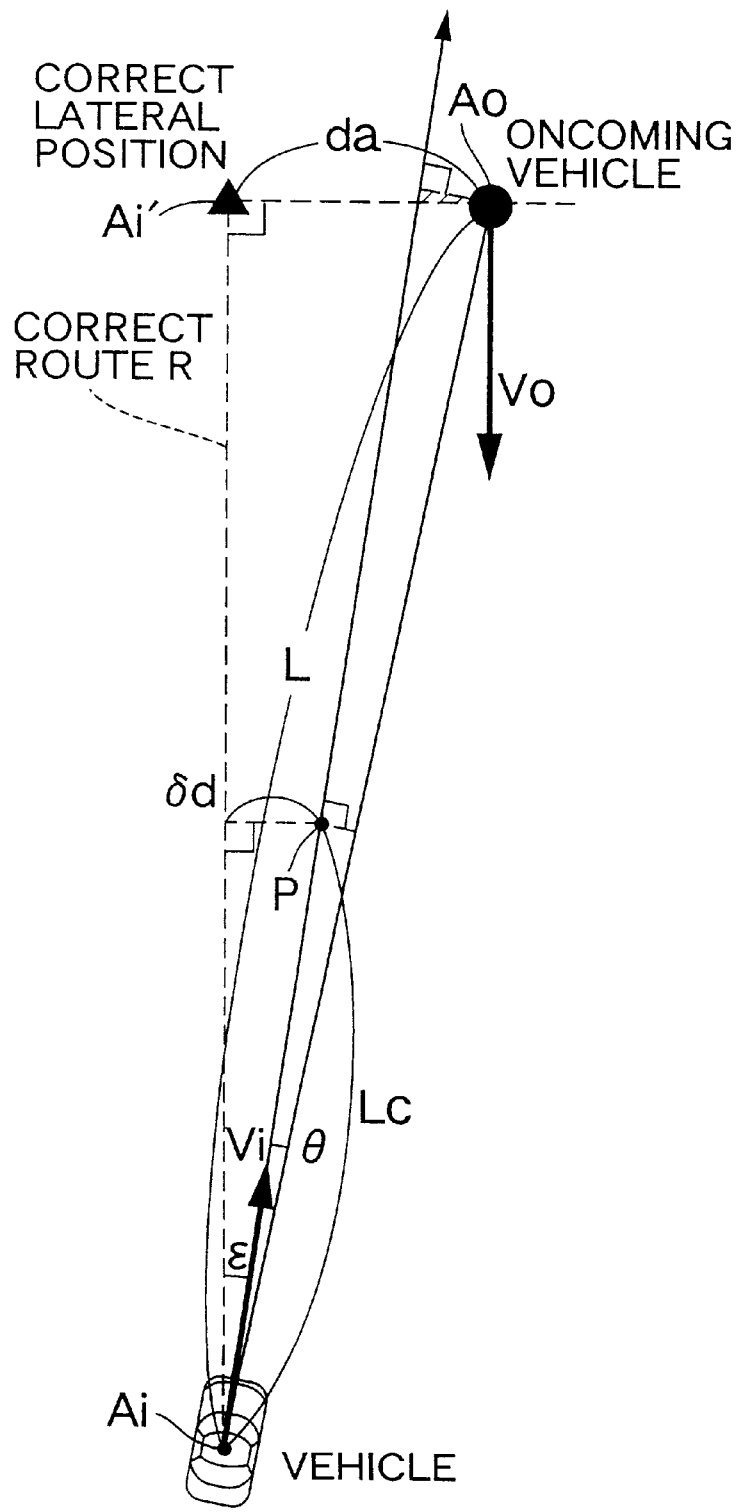
Figure 17:
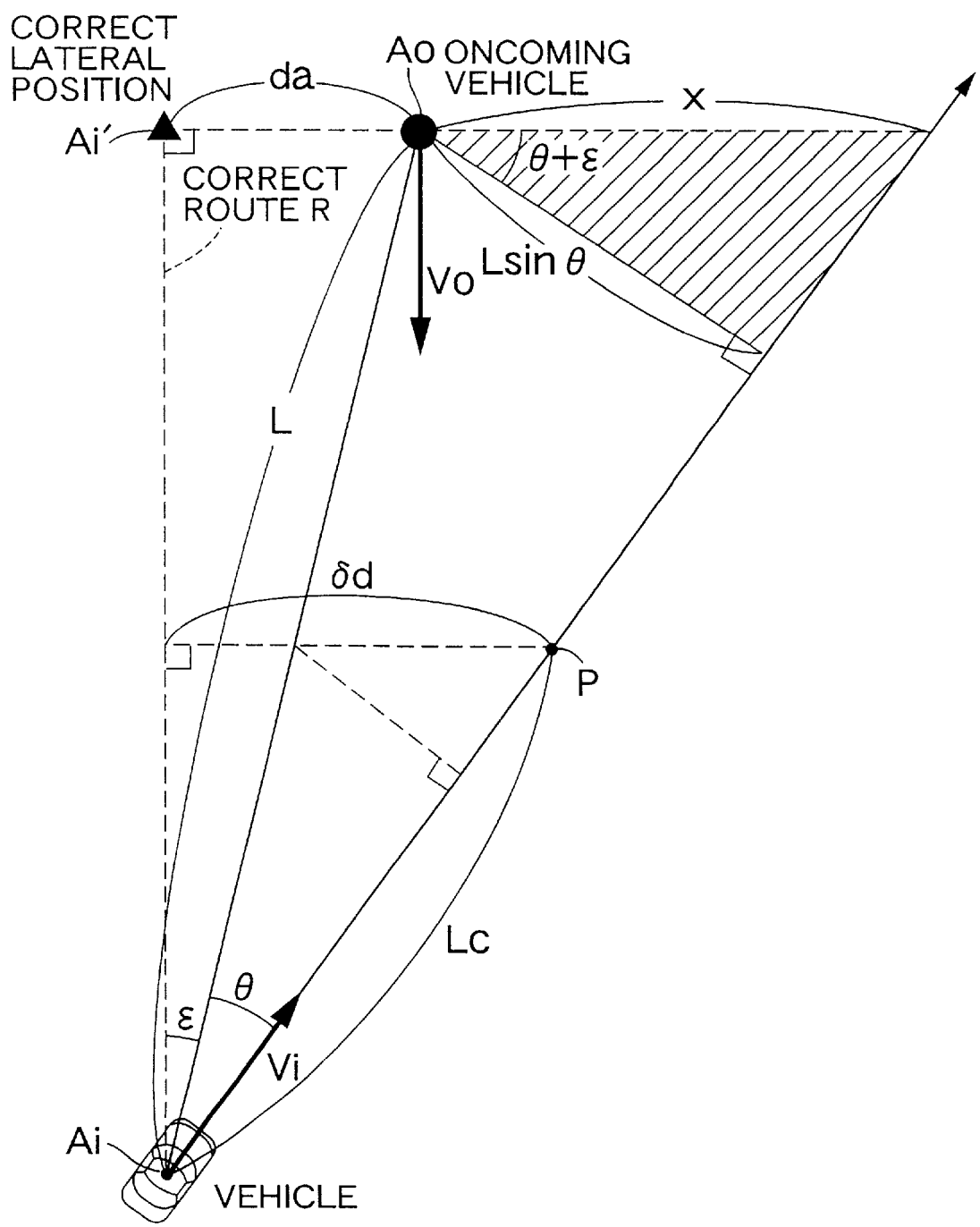

Next, the details of the 'collision determination' in step S22 are explained on the basis of the flowchart in FIG. 9 and the explanatory views in FIG. 15 to FIG. 17.

Firstly, in step S41 the vehicle speed Vi of the vehicle Ai is calculated on the basis of the outputs from the vehicle speed sensors $S_5$ . . . , in step S42 the yaw rate γi of the vehicle Ai is calculated on the basis of the output from the vehicle yaw rate sensor $S_4$, in step S43 the distance L between the vehicle Ai and the oncoming vehicle Ao is calculated on the basis of the output from the radar device 3, in step S44 the relative speed Vs between the vehicle Ai and the oncoming vehicle Ao is calculated on the basis of the output from the radar device 3, and in step S45 the relative angle θ between the vehicle Ai and the oncoming vehicle Ao is calculated on the basis of the output from the radar device 3. In the subsequent step S46 the correct route R of the vehicle Ai that will allow it to pass the oncoming vehicle Ao without collision, is set on the basis of a correct lateral distance da measured from the current position of the oncoming vehicle Ao. This correct lateral distance da is set beforehand and is, for example, 3 m. In the subsequent step S47 the yaw rate γo of the oncoming vehicle Ao is calculated from the vehicle speed Vi and the yaw rate γi of the vehicle Ai and the positional relationship between the vehicle Ai and the oncoming vehicle Ao. In step S48 the lateral deviation δd between the correct route R and the vehicle Ai at the position (predicted collision position P) where the vehicle Ai passes the oncoming vehicle Ao is calculated. The step in which this lateral deviation γd is calculated is explained in detail below by reference to FIG. 15.

FIG. 15 illustrates a state in which the vehicle Ai mistakenly enters the vehicle lane of the oncoming vehicle Ao on a road where driving is on the left. In the figure, the correct lateral position Ai' is the position on the correct route R for the vehicle Ai corresponding to the current position of the oncoming vehicle Ao in the lateral direction, and the distance between the correct lateral position Ai' and the oncoming vehicle Ao is the correct lateral distance da (for example, 3 m). L denotes the distance between the vehicle Ai and the oncoming vehicle Ao, which is calculated on the basis of the output from the radar device 3. θ denotes the relative angle between the vehicle Ai and the oncoming vehicle Ao, which is calculated on the basis of the output from the radar device 3, denotes the angle between the direction of the correct route R for the vehicle Ai and the direction of the oncoming vehicle Ao, which is geometrically determined on the basis of the distance L and the correct lateral distance da. Vi denotes the vehicle speed of the vehicle Ai, which is calculated on the basis of the outputs from the vehicle speed sensors $S_5$ . . . . Vs denotes the relative vehicle speed corresponding to the difference between the vehicle speed Vi of the vehicle Ai and the vehicle speed Vo of the oncoming vehicle Ao, which is calculated on the basis of the output from the radar device 3.

With regard to the hatched triangle in FIG. 15, the relationship below $$X \cos(\theta+\epsilon) = L \sin \theta \tag{1}$$

is satisfied, and when this equation is solved for X, the following equation $$X = L \sin \theta / \cos(\theta+\epsilon) \tag{2}$$

can be obtained. The value of the collision time tc (the length of time up to the time of passing or collision) measured on the basis of the current time can be obtained by dividing the distance L by the relative speed Vs.

$$tc = L/Vs \tag{3}$$

The distance Lc from the vehicle Ai to the predicted collision position passing position) can be obtained as the product of the vehicle speed Vi by the collision time tc.

$$Lc = Vi \cdot tc = L(Vi/Vs) \tag{4}$$

As is clear from FIG. 15, since two right-angled triangles having their vertices at an angle of (θ+ε) at the position of the vehicle Ai are similar, the following relationship is satisfied, $$L':L = \delta d:da + X \tag{5}$$

and, furthermore, the lateral deviation *d can be obtained as follows from the relationship Lc' cos ε=Lc cos (θ+ε) and the equations (2), (4) and (5).

$$\delta d = \frac{Vi\cos(\theta + \varepsilon)}{Vs\cos\varepsilon}\left\{da + \frac{L\sin\theta}{\cos(\theta + \varepsilon)}\right\} \tag{6}$$

Among the five variables on the right-hand side of equation (6), since Vi can always be calculated and Vs, L, θ and ε can be calculated from a single send and receive event of the radar device 3, the lateral deviation δd can be quickly calculated at the point when the radar device 3 detects the oncoming vehicle Ao for the first time. Therefore, even in the case where the collision time tc is not long enough because the vehicle Ai and the oncoming vehicle Ao are approaching each other, it is possible to quickly carry out a determination of the possibility of a collision and start the collision avoidance control.

Thus, in step S49 in the flowchart in FIG. 9 the lateral deviation δd is compared with a predetermined reference value for determining the possibility of a collision. If the lateral deviation δd is between a first reference value δdn for determining the possibility of a collision and a second reference value δdx for determining the possibility of a collision, that is, the relationship δdn<δd<δdx is satisfied, it is determined in step S50 that there is the possibility of a collision between the vehicle Ai and the oncoming vehicle Ao (see FIG. 15). On the other hand, if δd≦δdn as shown in FIG. 16 or δd≧δdx as shown in FIG. 17 it is determined in step S51 that there is no possibility of a collision between the vehicle Ai and the oncoming vehicle Ao. The state in FIG. 17 corresponds to for example, a case where the vehicle Ai obliquely crosses the vehicle lane of the oncoming vehicle Ao in order to enter a side road.

The first reference value δdn for determining the possibility of a collision and the second reference value δdx for determining he possibility of a collision are set appropriately according to the width of the vehicle Ai, etc., for example, the first reference value δdn for determining the possibility of a collision is set at 1.5 m, and the second reference value δdx for determining the possibility of a collision is set at 4.5 m.

In the above explanation, when calculating the lateral deviation δd, the yaw rate γi of the vehicle Ai and the yaw rate γo of the oncoming vehicle Ao are not considered, but by considering these yaw rates γi, γo, the collision can be avoided with higher precision.

When the vehicle Ai travels at a vehicle speed of Vi and a yaw rate of γi, a lateral acceleration of Viγi is generated and, therefore, by integrating this Viγi twice, the amount of lateral movement yi of the vehicle Ai can be calculated. Therefore, the amount of lateral movement yi of the vehicle Ai at a collision time tc of L/Vs is given by the equation below.

$$yi = (Vi \cdot \gamma i/2) \cdot (L/Vs)^2 \tag{7}$$

Similarly, when the oncoming vehicle Ao travels at a vehicle speed of Vo and a yaw rate of γo, a lateral acceleration of Voγo is generated and, therefore, by integrating this Voγo twice, the amount of lateral movement yo of the oncoming vehicle Ao can be calculated. Therefore, the amount of lateral movement yo of the oncoming vehicle Ao at a collision time tc of L/Vs is given by the equation below.

$$yo = (Vo \cdot \gamma o/2) \cdot (L/Vs)^2 \quad (8)$$

Thus, by using the following equation in which the lateral deviation δd of the equation (6) is corrected using the amount of lateral movement yi of the vehicle Ai and the amount of lateral movement yo of the oncoming vehicle Ao, the precision of the lateral deviation δd can be further enhanced.

$$\delta d = \frac{Vi\cos(\theta + \varepsilon)}{Vs\cos\varepsilon}\left\{da + \frac{L\sin\theta}{\cos(\theta + \varepsilon)}\right\} + yi + yo \quad (9)$$

The yaw rate γo of the oncoming vehicle Ao can be calculated on the basis of the turning radius and the vehicle speed Vo of the oncoming vehicle Ao by predicting the turning track of the oncoming vehicle Ao by detecting the position of the oncoming vehicle Ao multiple times on the basis of the output from the radar device 3. Therefore, the yaw rate γo of the oncoming vehicle Ao cannot be detected by a single send and receive event of the radar device 3, and a short calculation time is required to carry out the correction using the yaw rate γo of the oncoming vehicle Ao in equation (9). As explained in step S17 of the flowchart in FIG. 6, however, the head-on collision avoidance control is carried out when the vehicle Ai is traveling in a substantially straight line (traveling on a straight road), and it is rare in this case for the yaw rate γo of the oncoming vehicle Ao to have a large value. From this viewpoint, it is possible to secure sufficient precision without carrying out the correction using the yaw rate γo of the oncoming vehicle Ao.

Instead of using fixed values for the first reference value δdn for determining the possibility of a collision and the second reference value δdx for determining the possibility of a collision, if the first reference value δdn for determining the possibility of a collision and the second reference value δdx for determining the possibility of a collision are corrected by the traveling states of the vehicle Ai and the oncoming vehicle Ao at the time when the lateral deviation δd has been calculated, the head-on collision avoidance control can be carried out with yet higher precision. That is to say, correction of the first reference value δdn for determining the possibility of a collision is carried out using the three correction coefficients k1n, k2n and k3n as in the following equation;

$$\delta dn \leftarrow k1n \cdot k2n \cdot k3 \cdot \delta dn \quad (10)$$

and correction of the second reference value δdx for determining the possibility of a collision is carried out using the three correction coefficients k1x, k2x and k3x as in the following equation.

$$\delta dx \leftarrow k1x \cdot k2x \cdot k3 \cdot \delta dx \quad (11)$$

The correction coefficients k1n, k1x are looked up in the map shown in FIG. 18A on the basis of the length of time to the collision (collision time tc). In the region where it is predicted that the error in calculating the lateral deviation δd is small due to a short collision time tc, the correction coefficients k1n, k1x are kept at 1. In the region where it is predicted that the error in calculating the lateral deviation δd is large due to a long collision time tc, the correction coefficient k1n increases from 1 with increases in the collision time tc and the correction coefficient k1x decreases from 1 with increases in the collision time tc. Thus, by narrowing the width between the first reference value δdn for determining the possibility of a collision and the second reference value δdx for determining the possibility of a collision in the region where the error in calculating the lateral deviation δd is large, an uncertain head-on collision avoidance control can be prevented from being carried out.

The correction coefficients k2n, k2x are looked up in the map shown in FIG. 18B on the basis of the distance L between the vehicle Ai and the oncoming vehicle Ao. In the region where it is predicted that the error in calculating the lateral deviation δd is small due to a short distance L, the correction coefficients k2n, k2x are maintained at 1. In the region where it is predicted that the error in calculating the lateral deviation δd is large due to a long distance L, the correction coefficient k2n increases from 1 with increases in the distance L and the correction coefficient k2x decreases from 1 with increases in the distance L. Thus, by narrowing the width between the first reference value δdn for determining the possibility of a collision and the second reference value δdx for determining the possibility of a collision in the region where the error in calculating the lateral deviation δd is large, an uncertain head-on collision avoidance control can be prevented from being carried out.

The correction coefficients k3n, k3x are looked up in the map shown in FIG. 18C on the basis of the yaw rate γi of the vehicle Ai. When it is predicted that the error in calculating the lateral deviation δd is small since the yaw rate γi of the vehicle Ai is 0, the correction coefficients k3n, k3x are set at 1. When the error in calculating the lateral deviation δd increases with increases in the yaw rate γi of the vehicle Ai, the correction coefficient k3n increases from 1 and the correction coefficient k3x decreases from 1. Thus, by narrowing the width between the first reference value δdn for determining the possibility of a collision and the second reference value δdx for determining the possibility of a collision in the region where the error in calculating the lateral deviation δd is large, an uncertain head-on collision avoidance control can be prevented from being carried out.

Figure 7:
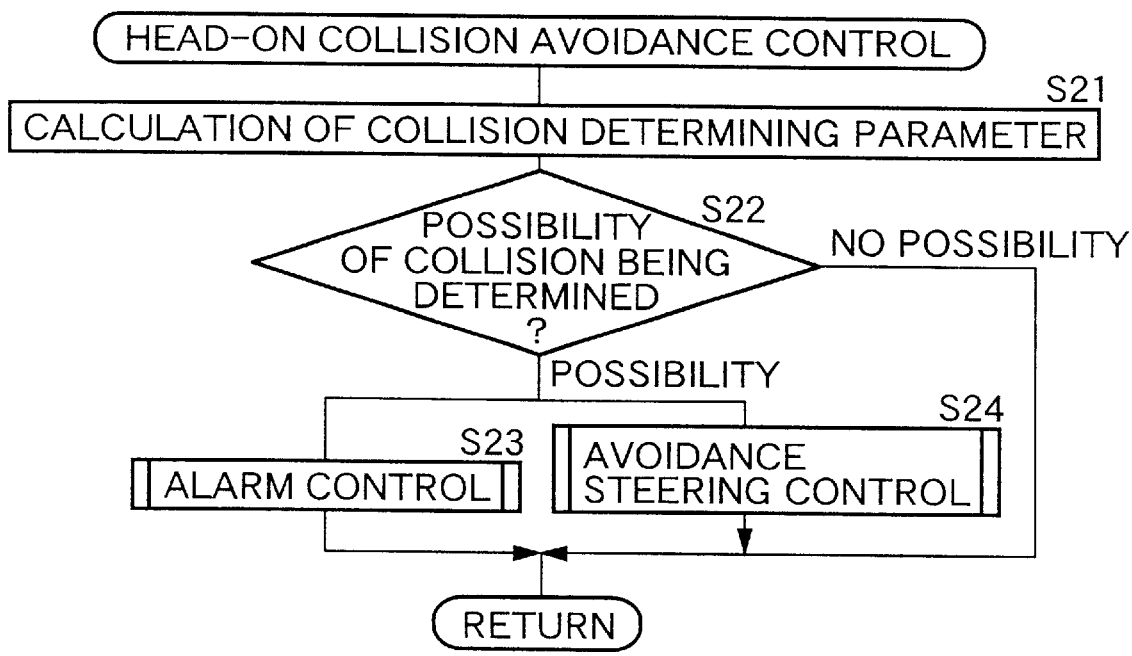
Figure 10:
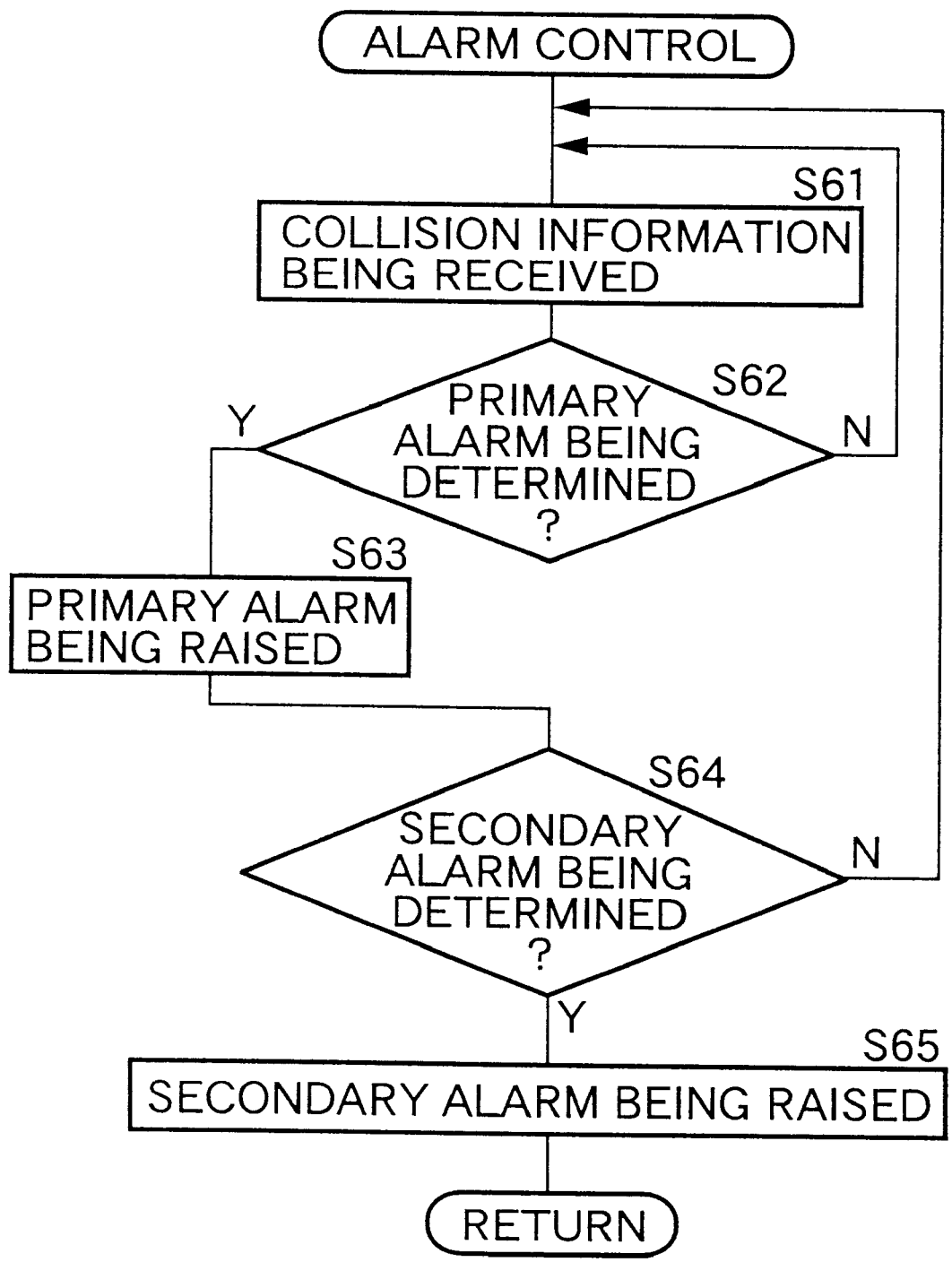
Figure 11:
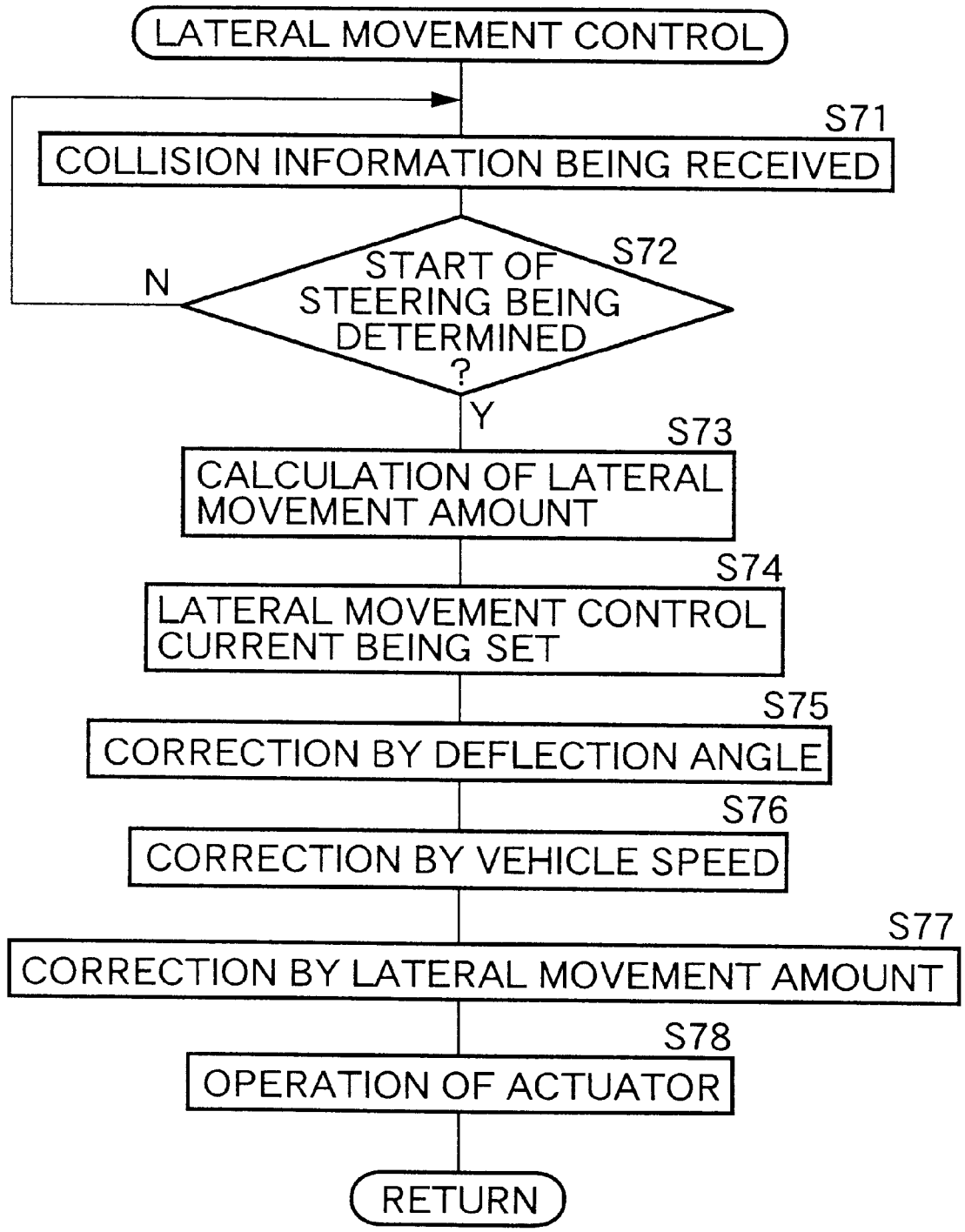

Details of the 'alarm control' in step S23 in the flowchart in FIG. 7 are explained on the basis of the flowchart in FIG. 10.

Firstly, collision information is received in step S61. The collision information comprises the collision time tc (time to the collision), the traveling states of the vehicle Ai and the oncoming vehicle Ao at the predicted collision position P, the lateral deviation δd, etc. In the subsequent step S62 the need for a primary alarm is determined, and when the collision time tc becomes, for example, less than 4 seconds, the alarm device 5 is operated in step S63 to start the primary alarm. In the subsequent step S64 the need for a secondary alarm is determined, and when the collision time tc becomes, for example, less than 3 seconds, the alarm device 5 is operated in step S65 to start the secondary alarm. The primary alarm is carried out when there is a comparatively large allowance in terms of the time before a collision, the secondary alarm is carried out when there is a comparatively small allowance in terms of the time before a collision, and the type of sound of the buzzer, the level of the sound or the color of the lamp are varied to make the driver recognize the difference between the two alarms. The driver can carry out a spontaneous avoidance operation by recognizing the danger of collision as a result of an alarm from the alarm device 5.

The 'avoidance steering control' in step S24 of the flowchart in FIG. 7 comprises a 'lateral movement control' in which the vehicle Ai is made to move laterally in the same manner as for a lane change, to avoid a collision with the oncoming vehicle Ao, and a 'yaw angle correction control' in which at the stage when the lateral movement is complete, the yaw angle of the vehicle Ai is returned to the state it was in at the time when the lateral movement was started. Details of the 'lateral movement control' among the 'avoidance steering controls' in step S24 are explained by reference to the flowchart in FIG. 11.

Firstly, after receiving the collision information in step S71, in the same manner as in the step S61 it is determined in step S72 whether or not steering has started, and when the collision time tc becomes less than a threshold $\tau_0$ (for example, 2.2 seconds) which is shorter than the 3 seconds which is the threshold for the secondary alarm, the amount of lateral movement necessary for avoiding a collision is calculated in step S73. This amount of lateral movement is basically the most recent value for the lateral deviation $\delta d$ calculated in the step S48, but in order to remove errors an average value is obtained using the previous value. In the subsequent step S74 and those following it the lateral movement control current $I_1$ for driving the actuator 17 is calculated for avoidance steering.

Figure 19A:
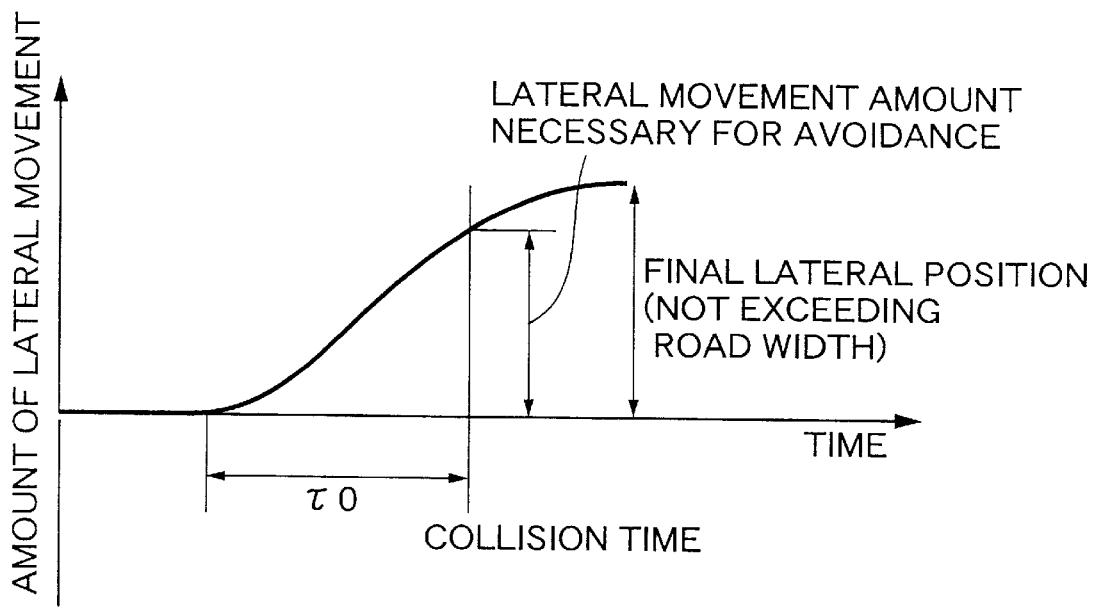
FIGS. 19A and 19B are graphs explaining a technique of calculating a reference lateral movement control current in order to avoid a collision.
Figure 19B:
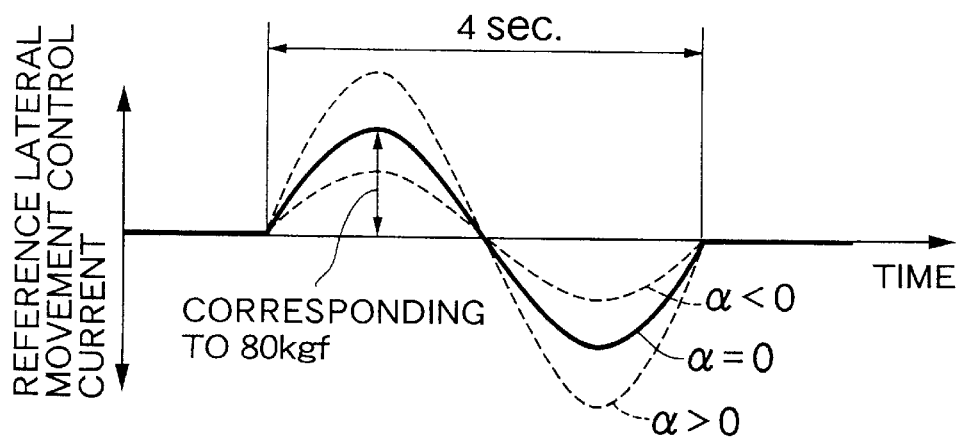

That is, in step S74 the lateral movement control current $I_1$ which becomes a reference, is set. As shown in FIGS. 19A and 19B, the avoidance steering is carried out so that the vehicle Ai returns to its original attitude after avoiding the oncoming vehicle Ao, and a reference value for the amount of lateral movement at the time when the collision time tc (threshold $\tau_o$) has passed is set at, for example, 2 m while taking into consideration the effect of the collision avoidance and the prevention of finally departing from the vehicle lane. Moreover, the maximum lateral acceleration YG and the steering speed generated by the avoidance steering must be prevented from becoming too large and giving an uncomfortable feeling to the driver and the lateral movement of 2 m must be carried out when a time $\tau_0$ of 2.2 seconds has passed since the steering started. From the above-mentioned requirements, for example, the maximum lateral acceleration YG is set at about 0.15 G and the steering frequency is set at about 4 seconds (0.25 Hz) in the present embodiment.

In order to return the vehicle to its original vehicle attitude (the yaw angle prior to starting the collision avoidance) after generating the amount of lateral movement for avoiding a collision shown in FIG. 19A, that is, in order to follow the same motion as that of a lane change, a reference lateral movement control current $I_1$ having the sinusoidal shape shown by the solid line in FIG. 19B is fed to the actuator 17 of the electric power steering device 2. Although the amplitude of the lateral movement control current $I_1$ varies depending on the weight of the vehicle, the characteristics of the tires, the suspension geometry, etc., in the case of a standard passenger car, it is appropriately about 80 kgf when converted to the thrust of the rack 15 generated by the actuator 17 (about 15 to 20 kgf·cm when converted to the steering power applied to the steering wheel 1 by the driver).

When the current supplied to the actuator 17 is increased, the steering torque generated by the actuator 17 increases. Therefore, setting a target value for the steering needed in order to avoid a collision using the value for the current supplied to the actuator 17 is the same as setting the target value for the steering using the steering torque generated by the actuator 17.

It is only when the driver does not carry out a steering operation spontaneously that the lateral movement control current $I_1$ is supplied to the actuator 17 without modification. In circumstances where the driver holds the steering wheel 1 strongly, a portion of the lateral movement control current $I_1$ is counterbalanced by the assist control current I of the electric power steering device 2 and as a result the amount of lateral movement might be reduced. That is, the case where the driver holds the steering wheel 1 strongly is a case where the driver determines that there is no need to carry out collision avoidance by spontaneous steering, and this driver's intention is reflected in the lateral movement control current $I_1$. In such a case, since the steering torque generated by the actuator 17 is transmitted to the driver's hands which are holding the steering wheel 1 strongly, it is possible to inform the driver of the danger of a collision through the steering wheel 1.

Figure 21:
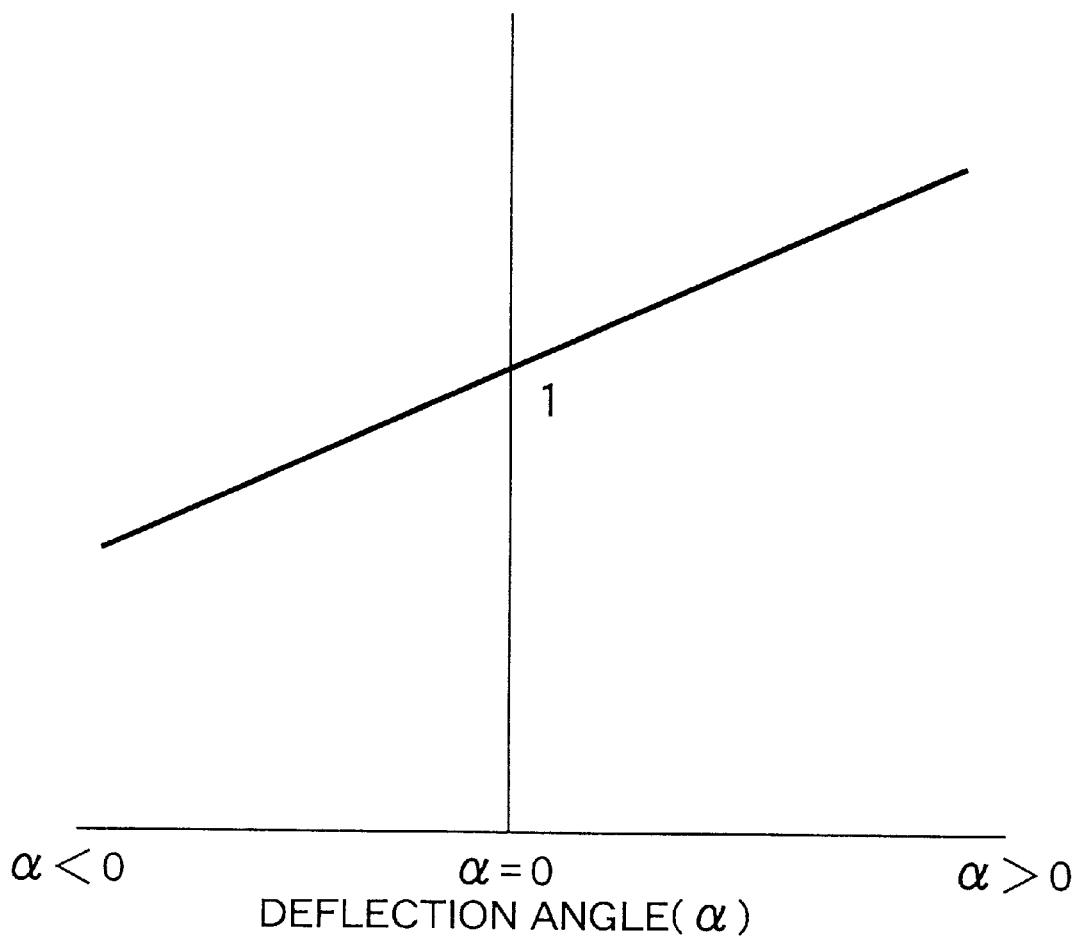

The reference lateral movement control current $I_1$ shown by the solid line in FIG. 19B is set by assuming that the direction in which the vehicle Ai travels is parallel to the vehicle lane as shown in FIG. 20A, but as shown in FIG. 20B when the direction in which the vehicle Ai travels is displaced by a deflection angle of a $\alpha>0$ towards the side of the oncoming vehicle Ao (right-hand side), the amount of lateral movement necessary for the avoidance increases, whereas as shown in FIG. 20C when the direction in which the vehicle Ai travels is displaced by a deflection angle of $\alpha<0$ towards the side opposite to that of the oncoming vehicle Ao (left-hand side), the amount of lateral movement necessary for the avoidance decreases. In step S75 a lateral movement control current correction coefficient is therefore looked up using the deflection angle a on the basis of the map shown in FIG. 21, and the corrected lateral movement control current $I_1$ is calculated by multiplying the reference lateral movement control current $I_1$ by the lateral movement control current correction coefficient. As a result, the corrected lateral movement control current $I_1$ increases its amplitude when the direction in which the vehicle Ai travels is displaced towards the side of the oncoming vehicle Ao and decreases its amplitude when the direction in which the vehicle Ai travels is displaced towards the side opposite to that of the oncoming vehicle Ao.

Figure 22:
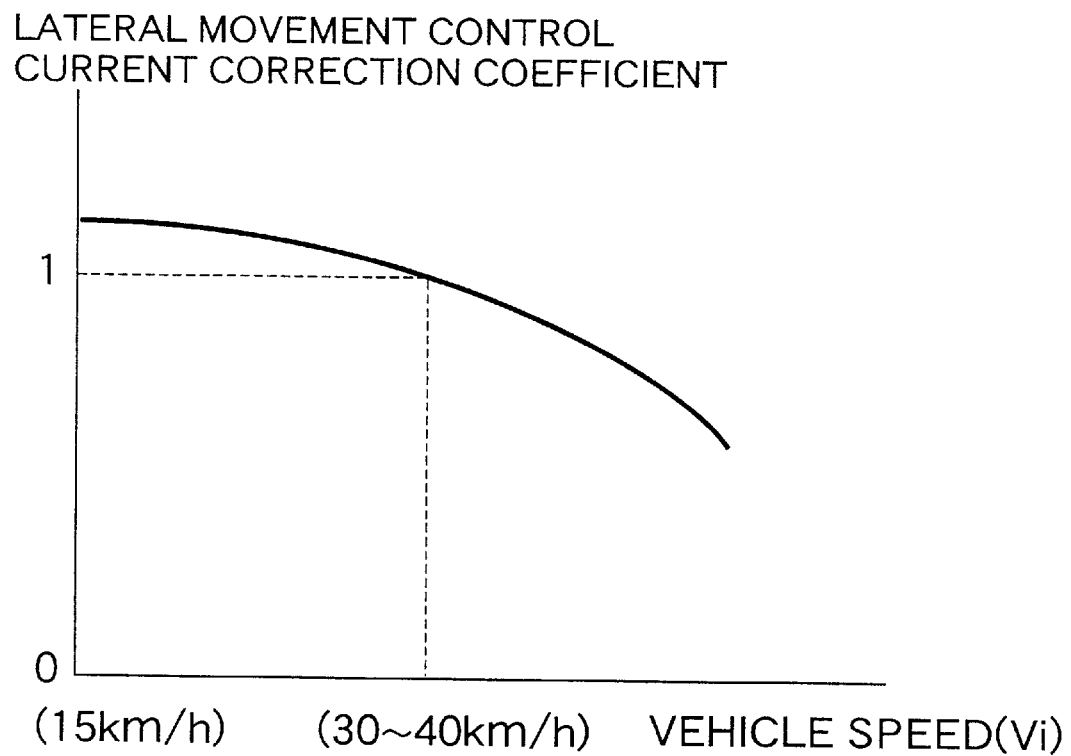

In the subsequent step S76 the lateral movement control current $I_1$ is further corrected according to the vehicle speed Vi of the vehicle Ai. The reference lateral movement control current $I_1$ is set so that the frequency is constant and the lateral acceleration YG generated thereby becomes constant, and therefore even when the vehicle speed Vi changes, the amount of lateral movement does not change greatly, but in reality due to the influence of the frictional force between the tires and the road surface accompanying the steering, there is a case in which a large lateral movement control current $I_1$ is required when the vehicle speed is low and the required lateral movement control current $I_1$ decreases when the vehicle speed is high. Therefore, the lateral movement control current correction coefficient is looked up from the vehicle speed Vi on the basis of the map shown in FIG. 22, and further correction is carried out by multiplying the lateral movement control current $I_1$ which has been corrected in the step S75 by the lateral movement control current correction coefficient.

In the subsequent step S77 the lateral movement control current $I_1$ is further corrected on the basis of the amount of lateral movement (lateral deviation $\delta d$) calculated in the step S73. That is to say, in the case in which the amount of lateral movement required for avoiding the collision is smaller than the amount of lateral movement generated by the lateral movement control current $I_1$ calculated in the steps S74 to S76, the lateral movement control current $I_1$ is corrected to decrease in proportion to the amount by which the lateral movement required for avoiding the collision is smaller. On the other hand, in the case where the amount of lateral movement required for avoiding a collision is larger than the amount of lateral movement generated by the lateral movement control current $I_1$ calculated in the steps S74 to S76, the lateral movement control current $I_1$ is not corrected.

In step S78 the driving of the actuator 17 is controlled according to the final lateral movement control current $I_1$ calculated in the step S77 in order to avoid a collision with the oncoming vehicle Ao.

Figure 12:
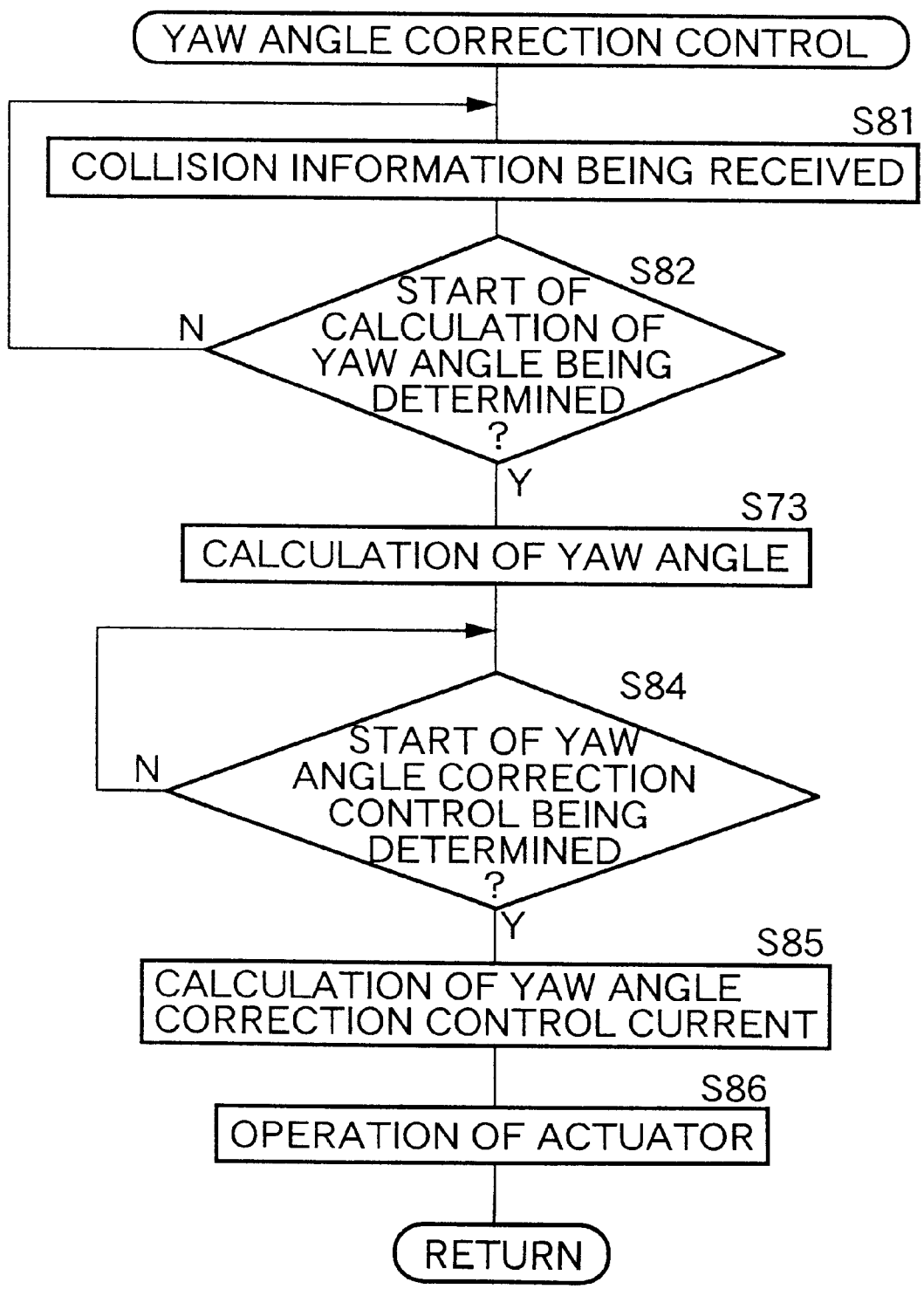

Next, the details of the 'yaw angle correction control' among the 'avoidance steering controls' of the step S24 are explained by reference to the flowchart in FIG. 12.

Firstly, in step S81, after collision information is received in the same manner as in the step S61, it is determined in step S82 whether or not calculation of the yaw angle should be started. Calculation of the yaw angle is not always carried out, and it is started at the same time as the steering of the lateral movement control is started in the step S72. When it becomes time to start the steering of the lateral movement control, in step S83 the yaw angle $\beta$ of the vehicle is calculated by integrating the yaw rate $\gamma i$ of the vehicle Ai detected by the vehicle yaw rate sensor $S_4$ from the point at which the steering of the lateral movement control is started. Therefore, the yaw angle $\beta$ of the vehicle is always 0 at the point at which steering of the lateral movement control is started. Thus, the yaw angle $\beta$ of the vehicle Ai can be detected precisely while eliminating the influence of drift of the vehicle yaw rate sensor $S_4$.

Subsequently, in step S84 it is determined whether or not the yaw angle correction control should be started. The yaw angle correction control is started when the yaw angle approaches 0 in the final stage of the lateral movement control, and in the present embodiment, the yaw angle correction control is started 1 second before completion of the lateral movement control which is set to be carried out for 4 seconds, in other words, 3 seconds after the lateral movement control is started. By setting the duration of the lateral movement control to be 4 seconds, it is possible to prevent automatic steering for avoiding a collision from being carried out rapidly thus giving the driver an uncomfortable feeling. Moreover, since the yaw angle correction control is not carried out for the first 3 seconds which is the essential part of the lateral movement control, reliable lateral movement can be carried out by preventing the yaw angle correction control from interfering with the lateral movement control and, furthermore, the yaw angle correction control can be carried out effectively at the final stage of the lateral movement control. In addition, the yaw angle correction control is carried out in order to return the yaw angle $\beta$ of the vehicle Ai which has been changed by the lateral movement control to its original state, and it can therefore be started following completion of the lateral movement control.

Subsequently, in step S85 the yaw angle correction control current $I_2$ for driving the actuator 17 in order to return the yaw angle $\beta$ of the vehicle to 0 is calculated, and in step S86 the actuator 17 is driven by superimposing the yaw angle correction control current $I_2$ on the lateral movement control current $I_1$ for carrying out the lateral movement control.

Figure 23:
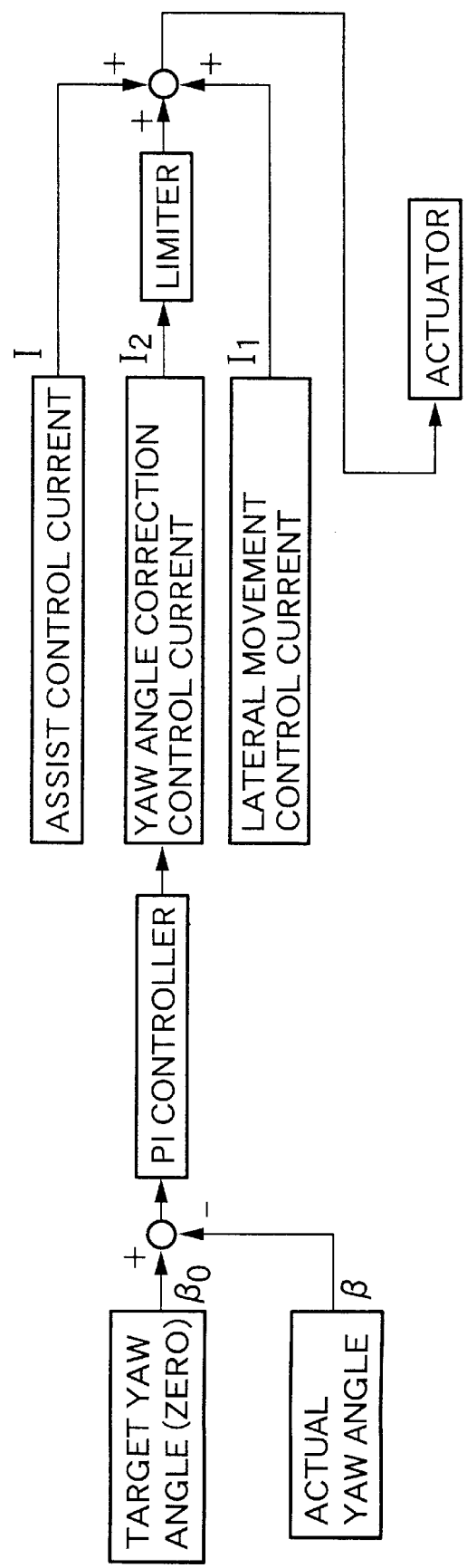

This is explained further in detail by reference to FIG. 23. The deviation between the target yaw angle $\beta_0=0$ on completion of the yaw angle correction control and the actual yaw angle $\beta$ which is obtained by integrating the yaw rate $\gamma i$ of the vehicle Ai is calculated; a PI controller into which the deviation is input, calculates the yaw angle correction control current $I_2$ to carry out a feedback control which converges the deviation to 0. This yaw angle correction control current $I_2$ is added to the assist control current I for assisting the steering operation by the driver and the lateral movement control current $I_1$, and the actuator 17 is driven on the basis of the summed value.

However, if a large steering torque is input into the steering wheel 1 by the driver during the collision avoidance control, the deviation might diverge without converging to 0, and in such a case, a large yaw angle correction control current $I_2$ is calculated and there is a possibility that the actuator 17 might operate beyond the driver's intention.

Therefore, by limiting the yaw angle correction control current $I_2$ not to exceed the assist control current I and the lateral movement control current $1_1$, it is possible to reduce the uncomfortable feeling given to the driver.

FIG. 24 illustrates the addition of the lateral movement control current $I_1$ to the yaw angle correction control current $I_2$. At this time it is assumed that a steering operation by the driver is not being carried out, and therefore the assist control current I is 0. The lateral movement control current $I_1$ having a sinusoidal shape is output over 4 seconds, which corresponds to one cycle thereof, from the time of starting the collision avoidance control, and output of the yaw angle correction control current $I_2$ is started 3 seconds after the start of the collision avoidance control and is compulsorily terminated after 2 seconds even if the actual yaw angle $\beta$ has not converged to 0. Therefore, the collision avoidance control is complete 5 seconds after it has started. Thus, by completing the yaw angle correction control in a limited time, endless continuation of the yaw angle correction control without the actual yaw angle $\beta$ converging to 0 can be prevented. Moreover, by partially overlapping the lateral movement control and the yaw angle correction control, it is possible to enhance the convergence of the control.

If the steering target value for avoiding a collision is set as a steering angle, in the case where the driver holds the steering wheel 1 strongly, since the actual steering angle does not converge to the target steering angle, the actuator 17 generates a large steering torque and this steering torque is transmitted to the driver causing an uncomfortable feeling. However, in 10 accordance with the present embodiment, since the steering target value for avoiding a collision is set by the steering torque (that is to say, the lateral movement control current $I_1$), even when the driver holds the steering wheel 1 strongly, the steering torque generated by the actuator 17 does not exceed a predetermined steering torque and thus the uncomfortable feeling given to the driver can be reduced.

The object detecting means of the present invention is not limited to the radar device 3 and it may be another means such as a television camera. Furthermore, the time for which the output of the lateral movement control current $I_1$ continues (4 seconds), the time from starting the output of the lateral movement control current $I_1$ to starting the output of the yaw angle correction control current $I_2$ (3 seconds) and the time for which the output of the yaw angle correction control current $I_2$ continues (2 seconds) are not limited by the embodiment and can be changed appropriately.

As hereinbefore described, when it is determined that there is a possibility of a collision between the vehicle and the oncoming vehicle, since the actuator control means controls the driving operation of the actuator to move the vehicle laterally, a collision with the oncoming vehicle can be avoided reliably even in the case where the driver does not spontaneously carry out an operation to avoid the collision. Moreover, even when the vehicle attitude of the vehicle is disturbed due to the lateral movement control by the actuator, since the vehicle attitude of the vehicle is returned to the state it was in prior to the avoidance of the collision by controlling the actuator using a yaw angle correction, the vehicle attitude can be automatically restored to its original state and the operational burden and the uncomfortable feeling given to the driver can be reduced.

In accordance with the invention, since the possibility of a collision is determined on the basis of a comparison between the correct route via which the vehicle can correctly pass the oncoming vehicle and the predicted collision position at which the vehicle is presumed to collide with the oncoming vehicle, it is possible to accurately determine the possibility of a collision between the vehicle and the oncoming vehicle.

By integrating the yaw rate of the vehicle from the point at which the lateral movement control is started, the yaw angle of the vehicle, that is the vehicle attitude of the vehicle, can be detected accurately. Moreover, by setting the initial value for the yaw angle to 0 at the point at which the lateral movement control is started, the influence of drift in the yaw rate detecting means can be eliminated to enhance the precision with which the yaw angle of the vehicle is detected.

By carrying out the yaw angle correction control to converge the integral value of the yaw rate to 0, after the avoidance of a collision, the vehicle attitude can be restored exactly to the state it was in prior to the avoidance of the collision.

Since the yaw angle correction control is started at a predetermined time before the completion of the lateral movement control or at a predetermined time after the start of the lateral movement control, a collision can be avoided effectively by effective liaison between the lateral movement control and the yaw angle correction control and the vehicle attitude can quickly be restored to the state it was in prior to the avoidance of the collision without giving the driver an uncomfortable feeling.

Since the lateral movement control is carried out over a predetermined period, the lateral movement control can be prevented from being carried out rapidly which changes the vehicle attitude suddenly.

Since the yaw rate correction control is completed in a predetermined time, endless continuation of the yaw rate correction control causing the driver to receive an uncomfortable feeling, can be prevented.

Since the driving force of the actuator in the yaw angle correction control is set to be smaller than the driving force of the actuator in the lateral movement control, inhibition of the smooth lateral movement of the vehicle can be prevented, and thus any uncomfortable feeling given to the driver can be reduced.

Since the amount of drive of the actuator to automatically avoid an oncoming vehicle is restricted not to be higher than a predetermined level, the vehicle can be prevented from drifting off the road due to too large an amount of lateral movement of the vehicle.

Since the amount of drive of the actuator in the lateral movement control increases as the direction in which the vehicle is traveling approaches the oncoming vehicle, a collision can be avoided reliably by generating a large amount of lateral movement when there is a high possibility of a collision.

Since the lower the vehicle speed of the vehicle, the larger the amount of drive of the actuator that is needed in the lateral movement control, when there is a high possibility of a collision, the collision can be avoided reliably by carrying out the lateral movement with good responsiveness.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A vehicle travel safety device comprising:

an object detecting means for detecting an object present in the direction in which a vehicle is traveling, a vehicle speed detecting means for detecting the speed of the vehicle, a relationship calculating means for detecting an oncoming vehicle on the basis of the output of the object detecting means and the vehicle speed of the vehicle detected by the vehicle speed detecting means and calculating the relationship between the vehicle and the oncoming vehicle, a collision determining means for determining the possibility of a collision between the vehicle and the oncoming vehicle on the basis of the relationship calculated by the relationship calculating means, an actuator for steering the vehicle, and an actuator control means for controlling the actuator when it is determined by the collision determining means that there is a possibility of a collision, wherein the control of the actuator includes a lateral movement control for moving the vehicle laterally to avoid a collision between the vehicle and the oncoming vehicle and a yaw angle correction control to return the vehicle attitude after the avoidance of the collision, to the state of the vehicle attitude prior to the avoidance of the collision.

2. A vehicle travel safety device according to claim 1, wherein the collision determining means determines the possibility of a collision on the basis of a comparison between a correct route by which the vehicle can correctly pass the oncoming vehicle and a predicted collision position at which the vehicle is presumed to collide with the oncoming vehicle.

3. A vehicle travel safety device according to claim 1 or 2, including a vehicle yaw rate detecting means for detecting the yaw rate ($\gamma$i) of the vehicle, and the vehicle attitude is detected by integrating the yaw rate ($\gamma$i) detected by the vehicle yaw rate detecting means, from the point at which the lateral movement control has started.

4. A vehicle travel safety device according to claim 3, wherein the yaw angle correction control is carried out to converge the integral value of the yaw rate ($\gamma$i) to 0.

5. A vehicle travel safety device according to claim 1 or 2, wherein the yaw angle correction control is started at a predetermined time before the completion of the lateral movement control or at a predetermined time after the start of the lateral movement control.

6. A vehicle travel safety device according to claim 1 or 2, wherein the lateral movement control is completed in a predetermined time after it has started.

7. A vehicle travel safety device according to claim 1 or 2, wherein the yaw angle correction control is completed in a predetermined time after it has started.

8. A vehicle travel safety device according to claim 1 or 2, wherein the driving force of the actuator in the yaw angle correction control is set to be smaller than the driving force of the actuator in the lateral movement control.

9. A vehicle travel safety device according to claim 1 or 2, wherein the amount of drive of the actuator in the lateral movement control is set such that the amount of lateral movement of the vehicle due to the amount of drive is not higher than a predetermined level.

10. A vehicle travel safety device according to claim 1 or 2, wherein the amount of drive of the actuator in the lateral movement control increases as the direction in which the vehicle is traveling approaches the oncoming vehicle.

11. A vehicle travel safety device according to claim 1 or 2, wherein the lower the vehicle speed of the vehicle, the larger the amount of drive of the actuator in the lateral movement control.

* * * * *